US006768457B2

(12) United States Patent
Lindenmeier

(10) Patent No.: US 6,768,457 B2
(45) Date of Patent: Jul. 27, 2004

(54) DIVERSITY SYSTEMS FOR RECEIVING DIGITAL TERRESTRIAL AND/OR SATELLITE RADIO SIGNALS FOR MOTOR VEHICLES

(75) Inventor: Heinz Lindenmeier, Planegg (DE)

(73) Assignee: FUBA Automotive GmbH & Co. KG, Bad Salzdetfurth (DE)

( * ) Notice: Subject to any disclaimer, the term of this patent is extended or adjusted under 35 U.S.C. 154(b) by 0 days.

(21) Appl. No.: 10/233,770

(22) Filed: Sep. 3, 2002

(65) Prior Publication Data

US 2002/0196183 A1 Dec. 26, 2002

Related U.S. Application Data

(63) Continuation of application No. 10/090,061, filed on Mar. 1, 2002, now Pat. No. 6,633,258.

(30) Foreign Application Priority Data

| Mar. 2, 2001 | (DE) | 101 10 154 |
| Sep. 13, 2001 | (DE) | 101 45 202 |
| Feb. 15, 2002 | (DE) | 102 06 385 |

(51) Int. Cl.[7] .............................. H01Q 3/02; H01Q 3/12
(52) U.S. Cl. ...................... 342/374; 342/448; 342/433; 455/277.2
(58) Field of Search ................................ 342/374, 448, 342/435, 433, 429, 463, 464, 465, 466; 455/277.2

(56) References Cited

U.S. PATENT DOCUMENTS

| 4,489,327 A | * 12/1984 | Eastwell ..................... 342/432 |
| 4,566,133 A | 1/1986 | Rambo |
| 4,584,709 A | 4/1986 | Kneisel et al. |
| 4,633,519 A | * 12/1986 | Gotoh et al. ................ 455/134 |
| 4,914,446 A | 4/1990 | Lindenmeier et al. |
| 6,218,997 B1 | 4/2001 | Lindenmeier et al. |
| 6,611,677 B1 | * 8/2003 | Lindenmeier et al. ...... 455/135 |
| 6,633,258 B2 | 10/2003 | Lindenmeier et al. |

FOREIGN PATENT DOCUMENTS

| DE | 36 18 452 | 12/1987 |
| DE | 40 08 505 | 3/1990 |
| DE | 40 34 548 | 5/1992 |
| DE | 39 26 336 | 3/2001 |
| EP | 0 952 625 | 10/1999 |
| EP | 1 041 736 | 3/2000 |

OTHER PUBLICATIONS

Charles C. Kilgus (IEEE transactions on Antennas and propagation, May 1975) (enclosed).
Stellios J. Patsiokas, (SAE Technical Paper 1001–01 1328; title "XM Satellite Radio Technology Fundamentals" by Stellios J. Patsiokas (enclosed).

* cited by examiner

Primary Examiner—Theodore M. Blum
(74) Attorney, Agent, or Firm—Collard & Roe, P.C.

(57) ABSTRACT

The invention relates to a diversity reception system for motor vehicles for digitally modulated terrestrial and/or satellite radio signals in a frequency range above 1 GHz. The system includes an antenna arrangement which supplies the reception signal to a radio receiver. The antenna arrangement is an antenna system having several individual antennas and several antenna components, and contains a controllable logic switching device. The individual antennas and the several antenna components are positioned on the vehicle so that different reception signals are available at the antenna connection point via discrete switching positions of a controllable logic switch. A reception level testing device comparatively determines the reception level contained in the data flow in the HF-channel with an HF channel bandwidth B. The level testing device is designed so that when initiated by the symbol cycle generated in the receiver and during the simultaneously occurring symbol identification of the received flow of data, the reception level is determined in each case within the shortest possible level testing duration.

10 Claims, 26 Drawing Sheets

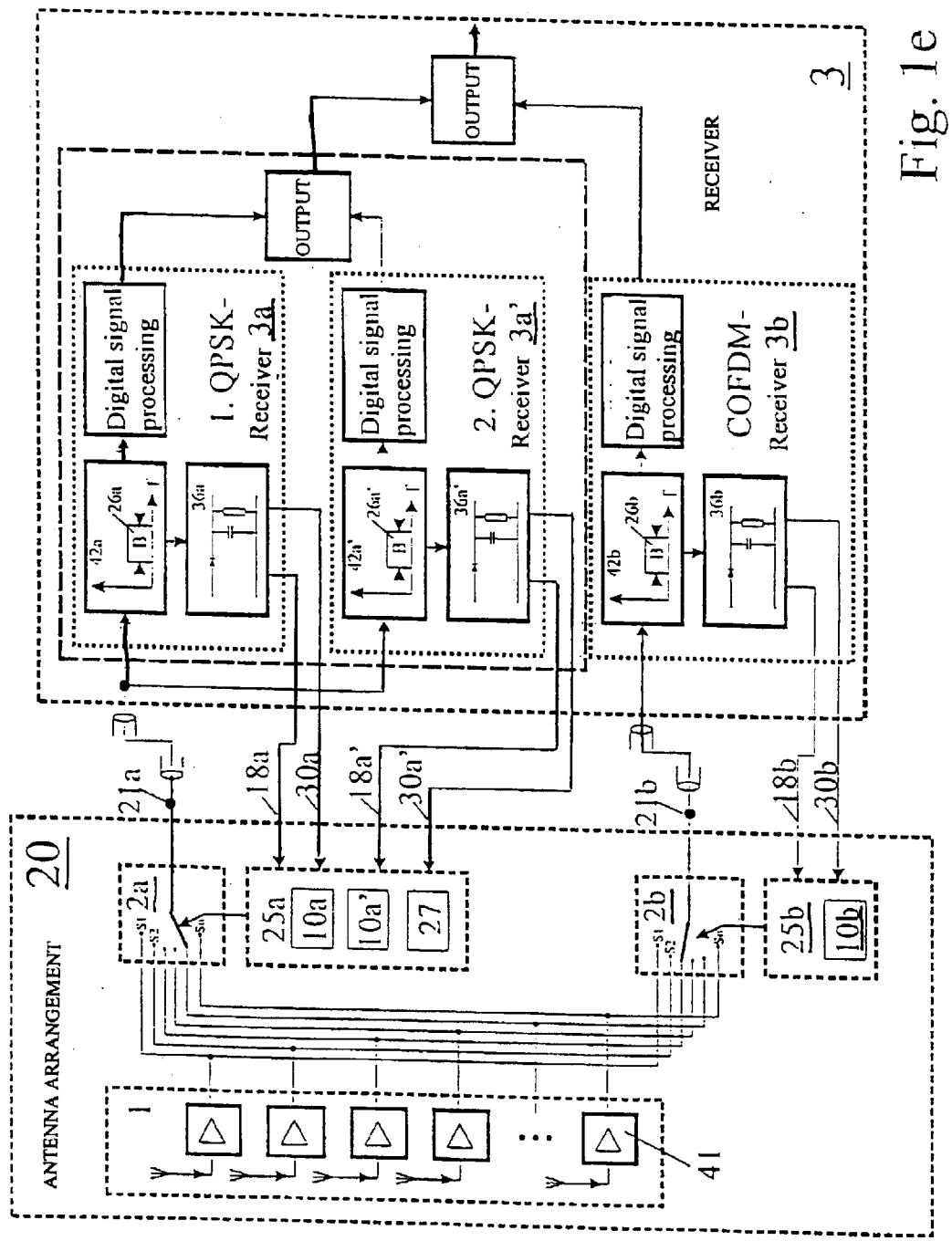

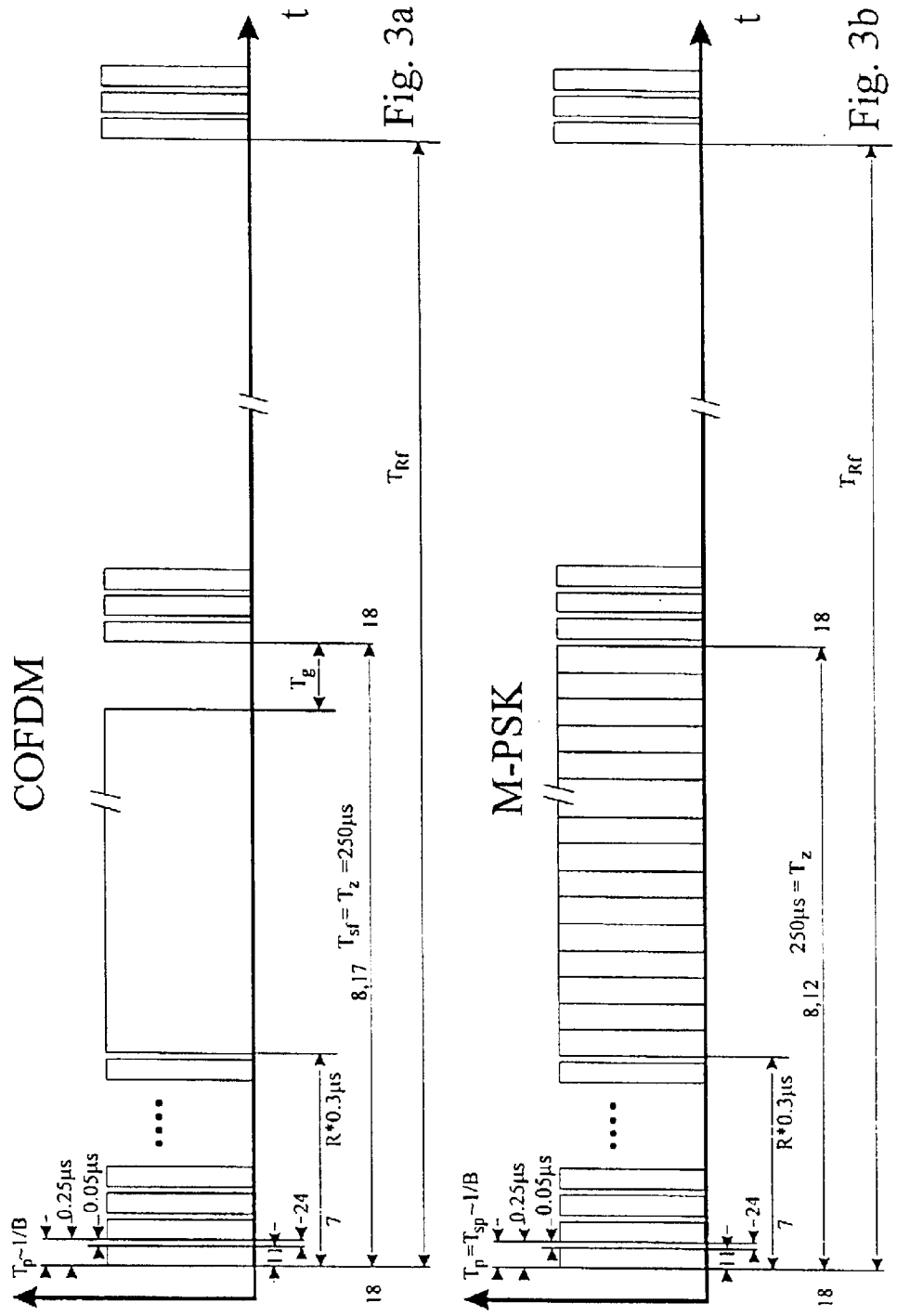

M-PSK

COFDM

DIVERSITY SYSTEMS FOR RECEIVING DIGITAL TERRESTRIAL AND/OR SATELLITE RADIO SIGNALS FOR MOTOR VEHICLES

CROSS REFERENCE TO RELATED APPLICATIONS

This application is a continuation in part of U.S. patent application Ser. No. 10/090,061 filed on Mar. 1, 2002 now U.S. Pat. No. 6,633,258 of which priority is claimed under 35 U.S.C. §120, in addition priority is claimed under German Patent Application numbers 10110154.6 filed on Mar. 2, 2001, 10145202.0 filed on Sep. 13, 2001; and 10206385.0 filed on Feb. 15, 2002 of which priority is claimed under 35 U.S.C. §119.

BACKGROUND

This invention relates to a diversity receiving system for digitally modulated terrestrial and/or satellite radio signals in the frequency range above 1 GHz for motor vehicles, with an antenna arrangement whose received signal is supplied to a radio receiver. In particular the OFDM method (orthogonal frequency division multiplex) and the MPSK method (phase shift keying with M phase conditions) are applied for the radio transmission of digital signals in the frequency range above 1 GHz. For the downlink of a satellite radio connection, the QPSK modulation (4 phase conditions) is frequently selected, and for terrestrial communication, the OFDM modulation is selected because the latter has a lower sensitivity with respect to traveling time differences between signals superimposing each other because of multi-way propagation. This also applies to the satellite radio system SDARS, which is designed for the area-covering mobile radio reception in the USA, and for terrestrial radio broadcasts which take place in heavily populated regions or overcrowded areas in addition to the radiation from 2 satellites.

The transmission disturbances occurring due to the multi-way propagation in connection with mobile reception have been successfully drastically reduced over the years with multi-antenna systems for transmitting analog transmitted signals such as, for example in connection with FM radio transmission. These systems are known from German patent P 3618452.7; P 4034548.3; and P 3926336.3. Because of the structure of OFDM or MPSK signals, these systems cannot be used with digital modulation. The present invention is based on European patent EP 1041736 A2. This patent describes and shows in FIGS. 1 and 2a diversity receivers for OFDM signals as prior art, in which, in connection with the transmission of the OFDM burst, preamble signals are transmitted outside of the time slot provided for the data transmission for the synchronization, channel estimation and antenna selection according to a level criterion. This method has the drawback that the time slot for the preamble signal denoted in FIG. 2 by reference numeral 11 has to be provided for, in the antenna selection in the transmitted burst signal. The most favorable antenna signal can be obtained exclusively depending on the occurrence of the burst signal, and not adapted to the necessity of updating, resulting from the driving movement in the multi-way scenario. This is of significance especially at carrier frequencies above 1 GHz. If, deeper level fading events are to be avoided, about ten updating events can be provided over a driving distance amounting to one half wavelength at 1 GHz. The updating then has to be repeated at a speed of 150 km/h at time intervals of 350 $\mu$s. For COFDM signals according to the DAB method (digital audio broadcasting) on the L-band (1.5 GHz), this would mean, in the reverse case, of having the unacceptable requirement that the speed of the vehicle be limited to 0.5 km/h.

Furthermore, defining a separate time slot for a preamble signal for the antenna election would lead to a reduction of the effective rate of transmittable data. The invention described in the EP document 1041736 A2 cited above, does not exclusively evaluate the signal level in view of the antenna selection, but provides, as a selection criteria for the antenna selected in connection with the subsequent data identification, additional signal errors that can be derived from a defined, known burst signal, such as, for example traveling time and phase effects. However, in this case, the updating of the antenna selection only takes place in response to the transmitted burst signal, and consequently at large time intervals.

Modern satellite radio systems, like those in use under the name "SDARS" reduce the high bit error rate caused by multipath propigation, shadowing effects, and changing reception conditions due to satellite movement by time-delayed multiple emission of the same signal content. Here QPSK-modulated signals are emitted in a time delayed manner by two satellites. There is also sent a terrestrial COFDM-modulated signal with information content in a time delayed manner, for support, especially in urban areas. In the receiver, the signals are transmitted in a frequency bandwidth of approximately 4 MHz respectively on different, but closely adjoining frequency bands. The signals are sent at approximately 2.33 Ghz and are received with a separate HF-ZF component, and the digital information is summarily evaluated by balancing the various time changes between channels. The system thus works based on the principle of frequency diversity, whereby the transmission paths make the decorrelated reception of different signals possible due to their diversity. However, it is necessary to support the system through a further diversity function, especially in areas that are urban, hilly or shaded by trees.

With the present invention, the signals can be received even if there is statistical interference via several reflected waves.

SUMMARY

One object of the invention is to create an efficient and inexpensive diversity system. Another object of the invention is to balance the cost of the device with sufficient and effective diversity efficiency.

Another object of the invention is to efficiently obtain an antenna diversity function that has an efficiency of $\Delta n_{ges}$.

Thus to achieve these objects the invention relates to a diversity reception system for receiving digitally modified satellite signals and digitally modified terrestrial signals according to a SDARS or similar standard. In with this invention, one of the three reception channels $p_d = p_s^n$ is considered for the probability for the shortfall of the necessary minimum reception level in diversity operation.

One of the three reception channels $p_d = p_s^n$ is used to calculate the probability for the shortfall of the necessary minimum reception level in diversity operation. With this formula, $p_s$ signifies the probability for the shortfall of the necessary minimum reception level of a satellite or terrestrial reception signal with a single antenna in the respective reception channel. The diversity efficiency of the total system in relation to the overall effective diversity efficiency $n_{ges}$ present in the digital component of the receiver can be calculated taking into account the transmission paths $n_{sdars}=$ 3. With this calculation, the resulting error probability of $p_{d_{ges}} - p_s^{nges}$ with $n_{ges} = n_t + n_{s1} + n_{s2}$ emerges for the assumed case of equal shortfall probabilities $P_s$ for all three signals. Here $n_t$, $n_{s1}$, $n_{n2}$ are the corresponding diversity efficiencies of the terrestrial or of the first and of the second satellite channel. The total diversity efficiency of the system therefore has the value $n_{ges}$. The growth of the diversity efficiency of the total arrangement due to the diversity efficiency of the antenna system alone is thus calculated as $\Delta n_{ges} = n_{ges} - n_{SDARS}$. This reference value is a description of the capacity of the diversity antenna system.

Differing evaluation criteria of the diversity efficiency result from the antenna diversity systems known until now from the special structure and the diversity of the high frequency channels. This same information respectively is however transmitted in a time delayed fashion. With the designs of all of these systems, the cost of the system is weighed against the effectiveness of the system to obtain the most efficient diversity system known.

SUMMARY OF THE INVENTION

Therefore, the present invention provides a diversity reception system, in which the received signal is updated in response to the selection of a more favorable received signal with the lowest possible bit error rate, at adequately short time intervals. Moreover, when the vehicle is driving at a high speed, and the data flow is being identified at the same time with a low cost cable link of the radio connection, the bit error rate is kept as low as possible, assuming that a user-friendly antenna is employed from the point of view of current motor vehicle engineering.

The advantage of using the diversity method of the invention is that with respect to the transmitted signals, no measures have to be implemented for using the diversity receiving system on the receiving side. Because of this compatibility, the method can also be used as an addition to a radio system designed for reception with an individual antenna. A further advantage is that the diversity function can also be achieved with only minimal additional expenditure in a receiver intended for reception with a single antenna, because only the intermediate frequency signal, and the symbol cycle signal, which are both available, are required as the minimum requirement that the receiver needs to satisfy. If these two signals are made available on the receiver, the receiving system can be supplemented to obtain an efficient diversity reception system, external of the receiver, by selecting suitable diversity antennas and by a diversity component.

Antennas for receiving systems for the reception of satellite radio signals in motor vehicles are known from German patent DE 40 08 505.8. These antennas are designed as crossed horizontal dipoles, with dipole halves consisting of linear conductor components inclined downwards in the form of a "V". These dipole halves are mechanically fixed in relation to each other at an angle of 90 degrees, and attached to a linear, vertical conductor that is secured on the upper end of a horizontally oriented, conductive base surface. To generate the circular polarization usually required in satellite communications, the two horizontal dipoles inclined downwards in the form of a "V", are electrically wired together via a 90-degree phase network. To receive terrestrially emitted, vertically polarized signals, vertical monopole antennas are provided.

For satellite antennas, an antenna gain of a constant, for example 2 dBi and 3 dBi is strictly required for circular polarization in the elevation angle range of, for example between 25 and, respectively 30 degrees, and 60 and, respectively, 90 degrees depending on the satellite communication system. This requirement has to be satisfied for an antenna that is built up in the center of a plane, conductive base board. With antennas of this type of construction, the antenna gain required in the range of the zenith angle can be generally obtained without problems. As opposed thereto, the antenna gain required in the range of low elevation angles of from 20 to 30 degrees can be realized only with difficulty and can in no case be realized with a very small structural height of the antennas as required for mobile applications. Specifically, it is also impossible for physical reasons to exceed the 3 dBi-values within the entire three-dimensional angle range and to thus realize an increased quality of the signal.

Antennas bent from linear conductors can be used to satisfy the gain requirements both in the angle range of low elevation, and with steep radiation. The form of antenna frequently used at the present time is the quadrifilar helical antenna according to KILGUS (IEEE transactions on Antennas and propagation, 1976, pages 238 to 241). These antennas often have a length of several wavelengths, and are not known in the form of flat antennas with a low structural height. Also, with an antenna with a low structural height as specified in EP 0 952 625 A2, it is not possible to satisfy the gain values specified above in the low elevation angle range.

In the SAE Technical Paper 2001-01-128 with the title "XM satellite Radio Technology Fundamentals" by Stellios J. PATSIOKAS, a helical antenna for the additional reception of terrestrially transmitted signals is combined for that reason with a monopole antenna, resulting in a large size construction of the combined antenna that is not suitable for use on motor vehicles.

A further problem that exists, in addition to the problem of the structural height, arises in conjunction with these antennas from the fact that because of the build-up required in automobile building on the outer surface of the motor vehicle, in conjunction with the impossibility of placing the antenna in the center of the roof for motor vehicle engineering reasons, or because of the frequently raised demand for integrating the antenna in the shape or form of the vehicle, the direction diagram formed in an idealized manner with the prescribed build-up on the surface is very highly deformed if it is attached to the vehicle, and has impermissible intake problems, as a rule. The ranges with low elevation of the radio waves are also frequently affected. The properties of circular polarization of the antenna may be completely lost in this angle range as well. These influences result from the deflections and reflections of the incident waves, which, in the frequency range above 1 to 3 GHz, are often caused on the edges of the vehicle and by the discontinuities of the body of the vehicle such as, for example the roof edge on the rear window, as well as by shading of the wave incidence by parts of the vehicle.

In addition, the received signal evaluated with the directional diagram changes strongly because of reflected waves superimposed on each other due to the movement of the vehicle, which may cause signal cancellations. All of these effects cannot be avoided with an antenna according to the specifications with the help of the build-up of the antenna on a board, and mounted on the vehicle. The impermissibly high bit error rates that result may lead to break-off of the radio connection. By selecting the suitable individual diversity antennas A1, A2, A3, etc. in the antenna system 1 in the diversity reception system as defined by the invention, it is possible to advantageously reduce these effects to a high degree.

Therefore, an important advantage of a diversity reception system as defined by the invention, is the fact that the demand for a single vehicle antenna with a directional diagram with the required circular polarization, such as with an idealized build-up on the prescribed or specified board surface, which cannot be satisfied in practical life, does not have to be separately satisfied for an individual directional diagram of the reception system in the entire three-dimensional angle range, either for the signals transmitted by the satellite or for the terrestrially transmitted signals. By separately realizing the sectoral directional diagrams, which are independent of one another, it is possible, for example to make available a single directional diagram at the selected points in time. This directional diagram has an adequate antenna gain in the required three-dimensional direction, including the small elevation angles that can be otherwise covered only with much difficulty. However, filling up the level fading events of 10 to 20 dB, which are substantial to some extent, over the driving distance, particularly in the area of partial shading, or shading of the directly incident received signals with the help of the diversity reception system as defined by the invention, is distinctly more effective in view of achieving low bit error rates, than meticulously adhering to a prescribed directional diagram on a circular board.

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

BRIEF DESCRIPTION OF THE DRAWINGS

In the drawings, wherein similar reference characters denote similar elements throughout the several views:

FIG. 1e shows a circuit similar to 1d with a different antenna arrangement.

FIG. 3a is a plot of the COFDM modulation signal;

FIG. 3b is a plot of the M-PSK modulation signal;

FIG. 10b shows a sectional view of the antenna system of FIG. 10a;

DETAILED DESCRIPTION

The present invention is explained in greater detail in the following example of a satellite radio reception system supported by the terrestrial transmission of the same signal content for motor vehicles at the carrier frequency "f" of about 2.3 GHz. In this frequency range, the free-space wavelength λ=12 cm. As opposed to terrestrial radio systems in the meter wave range, signals superimposing a direct signal at this frequency with great differences in the traveling time, have a low intensity, so that the major part of these signals is composed of reflections in the closer environment. The transmission bandwidth of the transmission channel between the transmitting antenna and the receiving antenna, which is conditioned the multi-way propagation, consequently has to be estimated to be greater than 10 MHz in most cases.

Figure 1A:
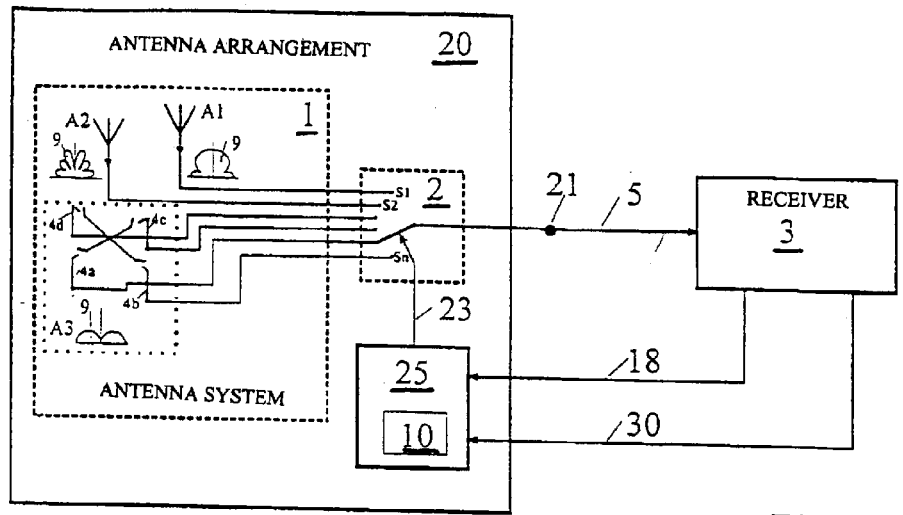
FIG. 1a shows an antenna diversity reception system as defined by the invention with an antenna arrangement and a receiver.

FIG. 1a shows an antenna diversity reception system as defined by the invention with an antenna arrangement 20 and a receiver 3, a logic circuit device 2, a receiver level testing device 25, with the symbol cycle signal 18 supplied via a pulse generator that can be triggered. A level comparator 10 is provided for the comparative determination of the receiver level 30.

In this radio system, signals having the same content transmitted for example by two satellites and by terrestrial transmitting stations via an HF channel bandwidth B of about 4 MHz each are transmitted in a close frequency neighborhood in relation to each other. For the transmission from the satellite, the digital QPSK method is used in this connection in most cases, and the COFDM method is mostly employed for the terrestrial transmission. It is necessary in either case to carry out the testing of the signals attendant to the selection of the most favorable received signal 5 so that no loss of data will occur, or that this loss will be as minor as possible, so that overall, the bit error rate is drastically reduced over the driving distance, because level fading events and thus phase errors connected therewith are avoided.

The diversity reception system shown in a basic form in FIG. 1a, is used for both digital types of modulation (COFDM and QPSK), by determining the level of the high-frequency signal within the HF channel bandwidth B with the help of the reception level testing device 25, in each instance, with the minimally possible level testing duration 11, and by advantageously carrying out this determination successively in terms of time. Both the coding of the OFDM signal, which is characterized by C, and the number M of the phase conditions of the MPSK signal (at QPSK, M=4) are not influenced by the instruction provided by the inventive circuit. By comparatively testing the level successively through reversals, with the help of logic circuit device 2, the available reception signals are successively selected within the frame of one test cycle with the help of a level comparator 10 and an addressable memory 35, so that a favorable reception signal 5 is then selected.

The test cycles are repeatedly initiated according to the invention in a running sequence after a suitably selected test cycle time spacing $T_z$ has elapsed. It is advantageous in this connection that if, after the test cycle has elapsed and the most favorable reception signal 5 has been selected, that the adjustment is maintained within the remaining time, within the test cycle time spacing $T_z$. Because of the limited HF channel bandwidth B, it is not possible to safely determine the reception level more rapidly than with the level test duration Tp~1/B. The reversing time 24 required for the antenna reversal itself is by one order of magnitude smaller than the level test time 11, so that the testing of the level and the reversal may take place jointly within the level test duration $T_p$ 13. To adjust a test cycle time spacing $T_z$ as defined by the invention, the following relation applies if the most favorable reception signal 5 has to be updated Z-times over the travel distance of one half wavelength:

$$T_z \leq 500 \text{ ms}/(Zf_{GHz}v_{kmh}) \tag{1}$$

With Z=5, $f_{GHz}$=2.33, and $V_{kmh}$=100, the result is $T_z$<430 μs, and at $v_{kmh}$=175, the result is $T_z$<=250 μs.

According to the invention it is important in this connection that the total time R·Tp required for R tests for testing and updating the most favorable reception signal 5 be substantially shorter than the test cycle time spacing $T_z$, so that the number of symbols identified with greater uncertainty will be as small as possible due to the selection process in connection with QPSK modulation. The following equation (1) applies to this relationship:

$$(RT_p/T_z) \geq (2*10^{-6})*ZRv_{kmh}f_{GHz}/B_{MHz} \tag{2}$$

With R=10 level tests per test cycle, and with a driving speed of 175 km/h, the relative time proportion required for selecting the most favorable reception signal 5 results according to equation (2), if the greatest possible test cycle time spacing $T_z$ with the other values specified above is adjusted to only 0.2%.

With COFDM modulation, it is desirable if the test cycle time spacing $T_z$ of equation (1) is selected to be greater than the FDM symbol duration $T_{sf}$, and the entire test cycle with an R number of required level tests is carried out within an FDM symbol duration $T_{sf}$, and if, in the interest of safe symbol identification, the total time $RT_p$ of an R number of tests is substantially smaller than the FDM symbol duration $T_{sf}$. Analogous to equation (2), with $T_{sf}$=1/$f_c$, with B=N·$f_c$, and with $T_p$=1/B, the following relation $V_p$ is obtained:

$$V_p = RT_p/T_{sf} = R/N_c \tag{3}$$

With $N_c$=1000 and R=10, this relation comes to $V_p$=1% and is adequately small. The reduction of the effective time available for the symbol identification is thus diminished only insignificantly. With a number $N_c$ of the sub-carriers that is too low, the result could be an excessively large time proportion for the level tests for the relation stated in equation (3). Therefore, provision is made according to the invention, to divide the number of R tests into a number S of successive symbols, so that the testing time required within an FDM symbol duration $T_{sf}$ represents itself as R·$T_p$/S and the following applies accordingly to equation (3):

$$V_p = RT_p/T_{sf}S = R/N_cS \tag{4}$$

If the permissible test cycle time spacing $T_z$ is greater than the FDM symbol duration $T_{sf}$, then it suffices according to the invention, if the most favorable reception signal is not updated with each transmitted symbol. The following relation serves to determine the test cycle time spacing $T_z$ at the given HF channel bandwidth B, with the given number of sub-carriers $N_c$, and at the maximum driving speed $V_{kmh}$:

$$T_z/T_{sf}=(B_{MHz}*10^6)/(2f_{Ghz}v_{kmh}N_c) \quad (5)$$

Taking into account equation (4), it is therefore sufficient if a test cycle is carried out only in each integral $(T_z/T_{sf})$-ten successively following symbol.

However, with the numerical values specified above by way of example, a relation of $T_z/T_{sf}$~1 is obtained for a maximum driving speed of $v_{kmh}$=175, i.e. according to the invention, the test cycle time spacing $T_z$ can be selected equal to the FDM symbol duration $T_{sf}$. At Z=5 updating events over a driving distance of $\lambda/2$ during only each second symbol received, the maximum driving speed thus would be limited to approximately 80 km/h.

With an advantageous low cost embodiment of the invention, the reception level testing device 25, and the logic circuit device 2 according to FIG. 1a are disposed in the neighborhood of the antenna arrangement 20 in terms of space. Moreover, the symbol cycle signal 18 is supplied together with the reception level 30 via a high-frequency line between antenna connection point 21 and receiver 3. This embodiment of the invention is connected with the advantage that receiver 3 does not need to be substantially pre-equipped for a reception system, of the invention, because symbol cycle signal 18 and reception level 30 are generally present in receiver 3, as a rule.

Therefore, FIG. 1a shows a basic embodiment of a reception system of the invention, whereby a bandpass 26 and a reception level indicator 36 (see FIG. 1c) are contained in receiver 3 whose output signal reflects reception level 30, and is supplied to a reception signal testing device 25. In addition, symbol cycle signal 18 is supplied to reception level testing device 25, so that a reversing signal 23 derived therefrom can be used by logic circuit 2, according to the sequence of level testing events described above for selecting a good or the most favorable reception signals 5. Antenna system 1 contains, in this embodiment, a number of individual antennas A1, A2, A3, which can be realized from antenna components 4a, 4b, 4c in view of the required diversity of the reception signals 5 with an advantageously high degree of freedom. To evaluate each symbol, an optimal reception signal 5 is thus available at antenna connection point 21 on the input of receiver 3.

Figure 1B:
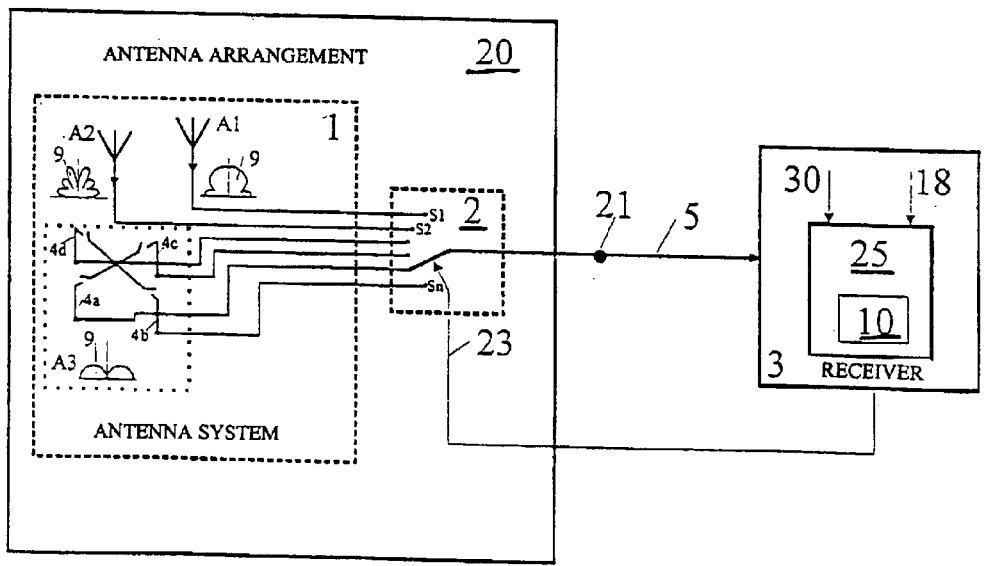
FIG. 1b shows the same circuit as FIG. 1a, but with a receiver level test device contained in the satellite radio receiver.

FIG. 1b shows an arrangement of the invention that is similar to the one of FIG. 1a, but with reception level testing device 25 contained in the satellite radio receiver 3.

Figure 1C:
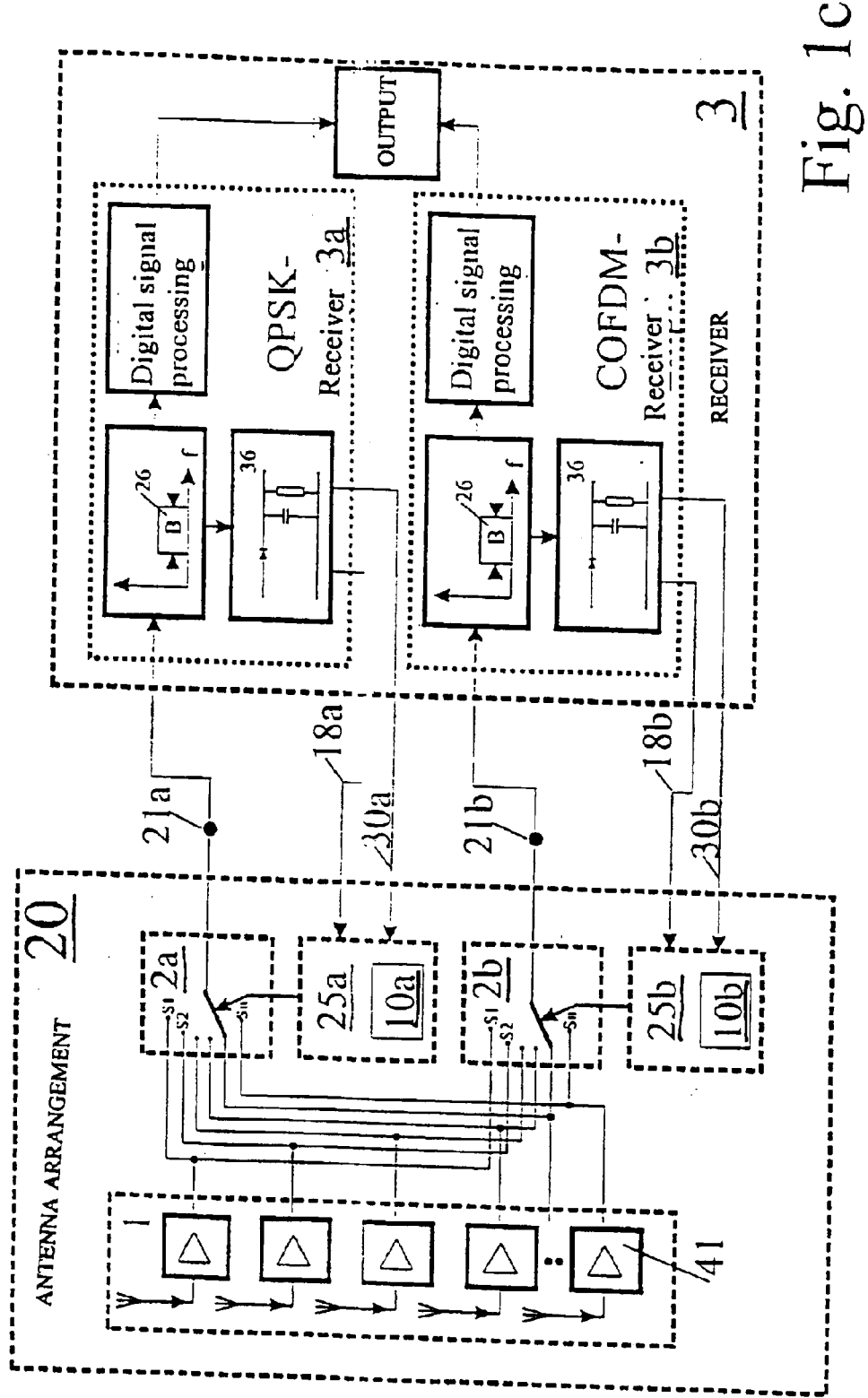
FIG. 1c shows a similar circuit as FIG. 1a, but with a receiver 3 having receiver branches for signals with QPSK modulation and for receiving signals with COFDM and COFDM modulation of the HF-carrier.

FIG. 1c shows a combined antenna diversity system of the invention for the simultaneous and coordinated reception of digitally modulated satellite radio signals according to the Q-PSK method, and of radio signals digitally modulated according to the COFDM method and transmitted by terrestrial radio stations according to the COFDM method, on neighboring high-frequency bands with the same HF channel bandwidth B, but in each case with a signal content that is offset by the traveling time.

Both systems have an antenna arrangement 20 with an antenna system 1, which supplies reception signals 5 that are different in terms of diversity. With the help of the logic circuit device 2a and reception signal level testing device 25a, the most favorable reception signal 5 is offered in the updated form to receiver part 3a for receiving the QPSK-satellite signal at the antenna connection point 21a via the test cycle process, in each case, with a test cycle time spacing $T_z$. Likewise, in each case following the level testing events at the start of an FDM symbol duration $T_{sf}$, the reception signal 5 that is the most favorable for receiver part 3b for receiving the COFDM-modulated terrestrial signal is available at the antenna connection point 21b. Both of the receiver parts 3a and 3b are contained in receiver 3 for evaluating the reception signals with the same signal content. According to the invention, for the antenna selection in the QPSK receiver, reception level 30a and symbol cycle signal 18a are supplied to the reception level testing device 25a with level comparator 10a.

Figure 1D:
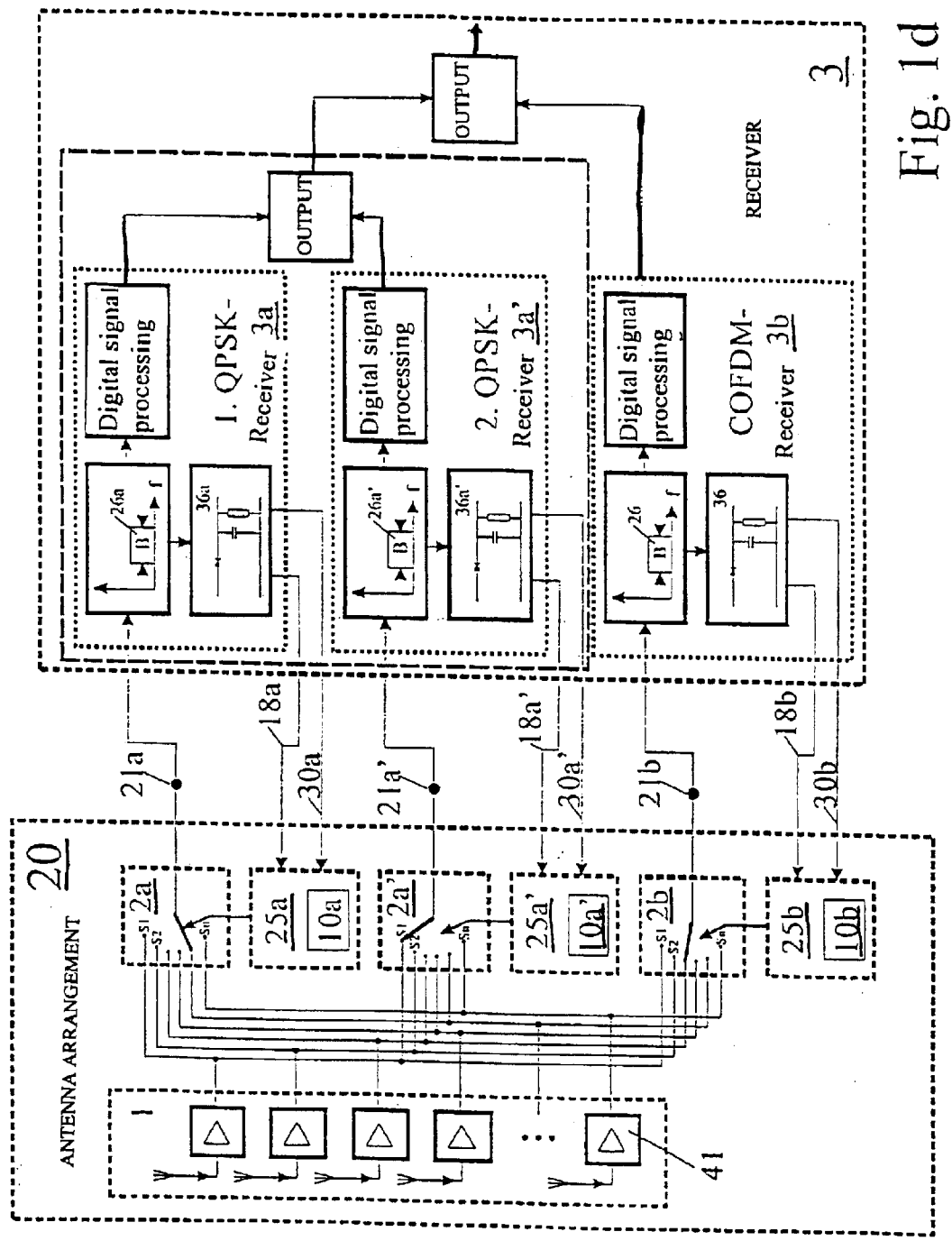
FIG. 1d shows a similar circuit as FIG. 1c, but with a receiver with a further reception branch for signals with QPSK modulation which are transmitted by another satellite.

In FIG. 1d, the combined antenna diversity system of the invention shown in FIG. 1b is supplemented by another branch whose components are denoted by "a'", for the simultaneous and coordinated reception of a further satellite radio signal digitally modulated according to the QPSK method. This satellite radio signal is transmitted for supporting the reliable transmission of another satellite, for the simultaneous and coordinated reception of radio signals transmitted by the first satellite, and of the radio signals transmitted by terrestrial radio stations on neighboring high-frequency bands having the same HF channel bandwidth B, in each case, of the same signal content offset by the traveling time. All received signals are coordinated and evaluated in the receiver 3, so that the most reliable data transmission is obtained by means of the antenna diversity function, in association with the two satellite transmission paths, and the terrestrial transmission path.

Both in connection with signals with QPSK modulation and COFDM modulation of the HF carrier, the test cycle time spacing $T_z$ is therefore selected according to the invention so that the reception conditions are practically constant within this time. This is effected by updating this adjustment at least five times within the driving distance amounting to one half of the wavelength of the high-frequency carrier. This is illustrated in FIG. 2 with the help of the reception signals of the antennas A1, A2 and A3 over the driving distance "s" based on the wavelength $\lambda$, with the help of the time raster shown below by way of example for the test cycle time spacing $T_z$=250 $\mu$s at a driving speed of 100 km/h.

Figure 2:
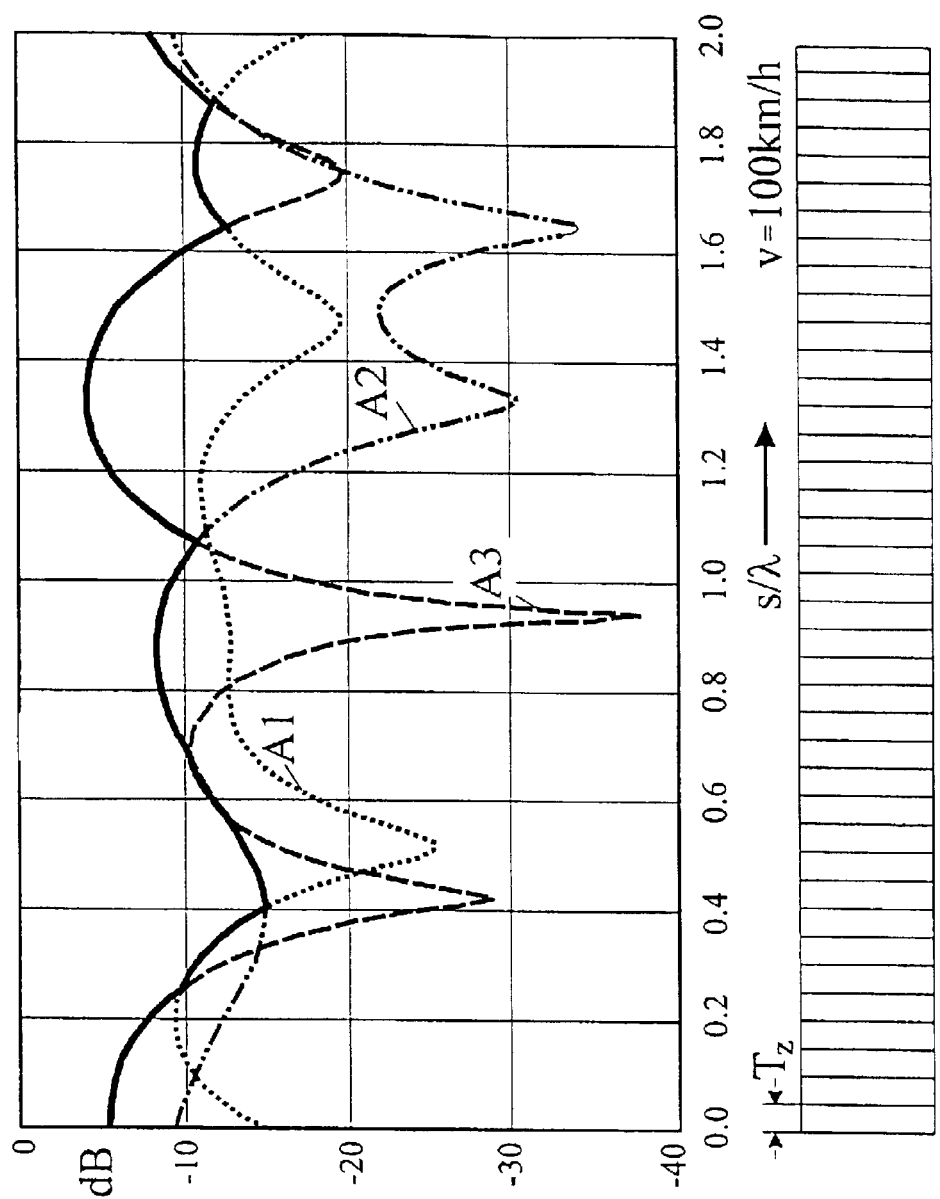
FIG. 2 shows the level curves of the received signals of three individual antennas over a driven distance of 2.

FIG. 2 shows level curves of the received signals of three antennas over a driven distance of 2 $\lambda$, and the maximum level (top) selected therefrom according to the invention by antenna diversity. The time raster (bottom) represents a test cycle time interval $T_z$ that is adequately short for a driving speed of 100 km/h for updating the most favorable received signal 5 for the maximum level while driving a distance of $\lambda/20$.

FIGS. 3a and b shows a representation of the time sequence of the level testing events triggered by the symbol cycle 18. During the entire test time 7, the individual antennas are successively switched on for the test time 11 and the associated reception level is determined. Following a reversing time 24, the next individual antenna is switched on, so that up to R individual antennas can be evaluated one after the other with respect to level.

FIG. 3a shows the COFDM modulation including R level testing events with level testing duration $T_p$=1/B at the beginning of a symbol with FDM symbol duration $T_{sf}$, and a test cycle time spacing $T_z$ selected with the same length as the latter.

FIG. 3b shows the M-PSK modulation including R level testing events with level testing duration $T_p$=1/B in successively received symbols with MPSK symbol duration $T_{sf}$=1/B initiated with a suitably selected test cycle time spacing $T_z$.

Figure 4C:
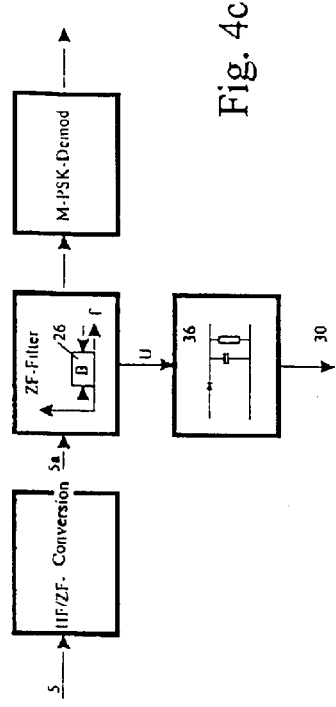
FIG. 4c shows the mode of operation of the reception level testing device 25 in the ZF-plane of the receiver.
Figure 4D:
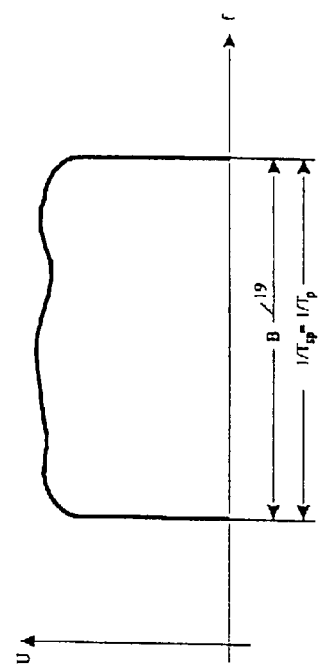
FIG. 4d shows the ZF frequency spectrum of the M-PSK signals.
Figure 4A:
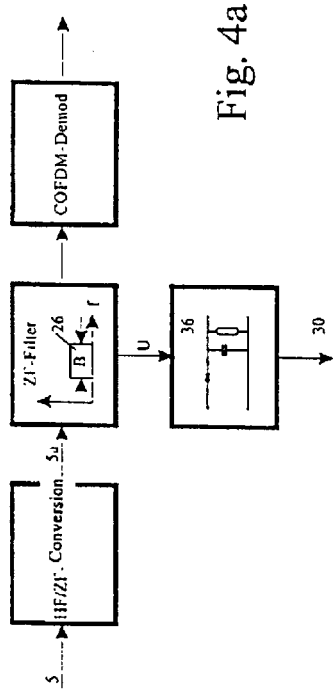
FIG. 4a shows a circuit for the mode of operation of the reception level test device in the ZF-plane of the receiver.

FIG. 4a shows the mode of operation of the reception level test device 25 in the ZF-plane of the receiver with the reception level indicator 36 for receiving COFDM signals. FIG. 4a shows the evaluation of the frequency band with COFDM modulation of the HF carrier with the help of the reception level indicator 36.

Figure 4B:
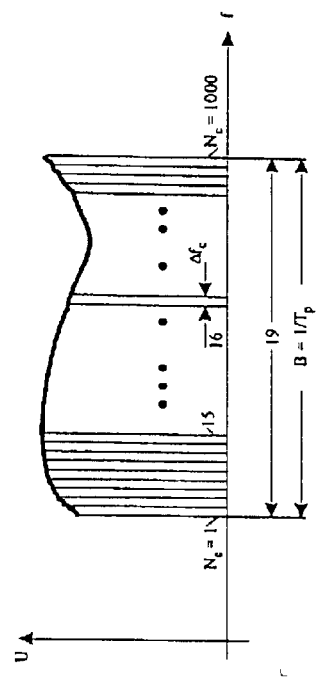
FIG. 4b shows a spectral representation of the COFDM signal.

FIG. 4b is a spectral representation of the COFDM signal with $N_c$ sub-carriers 15 with a spectral frequency spacing $f_c$ at a bandwidth B with low level fluctuation of the individual carriers because of the frequency-dispersing transmission channel. FIG. 4b shows the sub-carriers with the frequency spacing $f_c$ 16 in the intermediate frequency plane of the receiver. With an FDM symbol duration $T_{sf}$ of, for example 250 µs conforming to the frequency spacing $f_c$ 16, which is available for the phase identification of the $N_c$ number of sub-carriers parallel in time, a small time proportion that is technically negligible in comparison thereto is used according to the invention for finding among reception signals 5 available in terms of diversity, the one that results in a adequately large S/N ration, or supplies the maximum S/N ratio as compared to the other signals. This is made possible through the HF channel bandwidth $B=N_c \cdot f_c$ 19, which is large in comparison to the frequency spacing of the sub-carriers, so that the level test time 11 can be selected smaller than the symbol time $T_{sf}$ 14 by the order of magnitude of the number $N_c$ of the sub-carriers. With the large number of $N_c=1000$, thus up to 10 reception signals 5 in terms of diversity can be successively tested with respect to level with a time expenditure of about 1 to 2% of the FDM symbol duration Tsf required for such testing. The test cycle time spacing Tz selected as defined by the invention defines after how many received symbols, the following symbol will be used for updating the most favorable reception signal 5.

FIG. 4c shows the mode of operation of the reception level testing device 25 in the ZF-plane of the receiver with the reception level indicator 36 for receiving M-PSK signals. Here, the frequency band is evaluated with the MPSK modulation of the HF carrier present with the help of the reception level indicator 36 as well.

FIG. 4d shows the band-limited frequency spectrum of the M-PSK reception signals in the intermediate frequency planer of the receiver. With a QPSK symbol duration $T_{sp}$ [for example of 0.25 µs=1/B=1/(4 MHz)], a comparatively technically negligible time proportion of the test cycle time spacing $T_z$ of the invention is used for selecting among reception signals 5 that are available in terms of diversity, the one that results in an adequately large signal-to-noise ratio, or which supplies the maximum S/N ratio in comparison to the other signals. This is substantiated by the large bandwidth B in view of equation (1).

With a QPSK symbol duration $T_{sp}$=1/(4 MHz)=0.25 µs, a relative number of only $R \cdot (T_{sp}/T_z)$=R/1000 symbols is obtained for R level tests, which are not received with an optimally available reception signal 5. However, the correct symbol identification is still probable for the predominant majority of the symbols because of the statistics of the reception field. The few symbols that may be subject to erroneous identification in this connection are corrected by the redundancy given with each digital communication system with error correction. On the other hand, the remaining symbols transmitted during the test cycle time space Tz are received with the full diversity effect of the available reception signals. This means that with a suitable selection of antennas in antenna system 1, a high diversity efficiency is achieved that strongly reduces the bit error rate over a driving distance, and highly reduces the probability of break-off or interruption of the radio connection with the problems of new synchronization. FIG. 3b shows the QPSK symbol duration $T_{sp}$=1/B, which is about equal to the level test duration $T_p$; the time sequence for an R number of level testing events, as well as a test cycle time spacing $T_z$ selected as defined by the invention.

To realize such a sequence for a QPSK modulation of the HF carrier with the carrier frequency "f", a pulse generator 31, for example, is present in the reception level testing device 25, which is supplied both with the reception level 30 and the symbol cycle signal 18 generated in the receiver. This pulse generator is triggered by symbol cycle signal 18 according to the number R of reception signals 5 to be tested, and thus supplies a pulse sequence whose pulse spacing time is equal to the QPSK symbol duration $T_{sp} \cdot 1/B$. The respective pulse sequence is transmitted in each case both to the pulse comparator 10 with the addressable memory 35, and to the logic circuit device 2 for switching in reception signals 5 in a sequential or addressed manner for selecting a reception signal 5 that is favorable in terms of diversity. After the required number of R level testing events has expired, the condition of triggerable pulse generator 31 and thus also the condition of logic circuit device 2 preferably remain unchanged via a time element 42 contained in pulse generator 31 for adjusting the test cycle time spacing $T_z$ until the comparative test cycle is newly initiated after $T_z$ has elapsed.

In the invention, with signals with COFDM modulation of the HF carrier, the level fading events are also reduced by determining the level of the actually switched-on high-frequency signal within the HF channel bandwidth B, in each case, after the minimum level testing duration $T_p$=1/B. The COFDM signal is composed of the time sequence of an $N_c$ number of parallel transmitted, phase-modulated sub-carriers with the frequency spacing $f_c$. Each packet of these sub-carriers is emitted in each case over the FDM symbol duration $T_{sf}$=1/$f_c$. To select a reception signal 5 that is as favorable as possible in terms of diversity, it is therefore possible to use the determination of the total energy that occurs in the IF-range in a band pass filter 26 of the channel bandwidth $B=N_c \cdot f_c$ over the level test duration $T_p \cdot N_c$ (e.g. $N_c$=1000) represents the number of the sub-carriers transmitted according to the COFDM method, whose frequency spacing ($f_c$) 16 amounts to, for example 4 kHz.

With this method, the multiple comparative level test takes place at the beginning of each transmitted symbol. In the present example, with level test duration $T_p$=1/B=0.25 µs, it takes a total test time of R·0.25 µs for selecting the most favorable reception signal 5 at an R number of level tests. This corresponds with a FDM test duration $T_{sf}$=1/$f_c$= $N_c$/B=1000*0.25 µs=250 µs. Under such quantity conditions, therefore, the entire remaining time of the FDM symbol duration $T_{sf}$ of (1−R/$N_c$)=(1−R/1000)*250 µs is available for identifying the symbol. This insignificant reduction of the time available for symbol identification is not connected with any deterioration of the identification. FIG. 2 shows that this symbol duration is adequately short for securing the frequent updating of the most favorable reception signal 5 even at high driving speeds. The comparative test process at the beginning of the FDM symbol duration $T_{sf}$, with the level test times $T_p$ with the reversing times of about 0.25 µs as well as the guard time $T_q$, is shown in FIG. 3a.

So that a sequence can be realized, a pulse generator 31 that can be triggered, is also present in the case of FDM modulation, for example in the reception level test device 25, which is supplied with both the reception level 30 and symbol cycle signal 18 generated in the receiver. This pulse generator is triggered by symbol cycle signal 18. Due to this triggering, it automatically generates a pulse sequence in accordance with the number of R reception signals to be tested, having a corresponding pulse sequence whose pulse spacing time is preferably selected as short as possible. It is thus about equal to the level test time $T_p \sim 1/B$. The pulse spacing time consists of level test time 11 plus the comparatively short reversing time 24. The respective pulse sequence is transmitted to both the level comparator 10 with the addressable memory 35, and the logic circuit device 2, to sequential or address switch reception signals 5, to select a reception signal 5 that is favorable in terms of diversity. After the required R number of level testing events has elapsed, the condition of the triggerable pulse generator 31 and logic circuit device 2 remains unchanged over the remaining time within the FDM symbol duration $T_{sf}$ until triggerable pulse generator 31 is triggered again, and the comparative test cycle is initiated again with one of the following symbols, preferably with the next symbol.

Figure 4E:
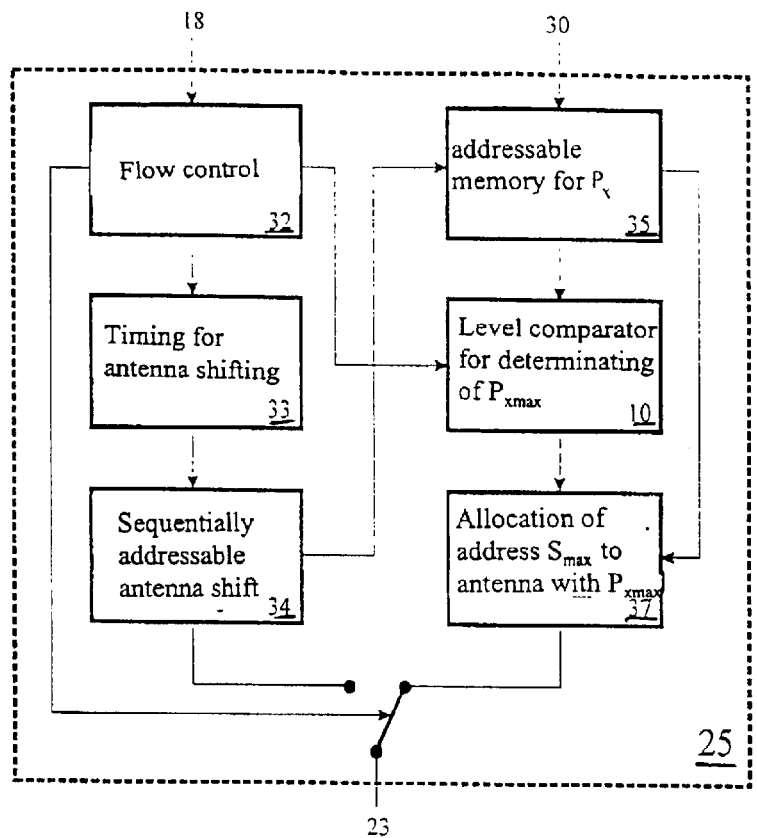
FIG. 4e shows the embodiment of the reception level testing device 25 of the invention.

FIG. 4e shows a block diagram for both digital types of modulation for an embodiment of this arrangement. In a timely embodiment, the entire reception level testing device 25 is designed as a microprocessor, which is controlled by a program, and processes, for example the program blocks shown in FIG. 4e. To determine the most favorable reception signal 5, it is possible to use in the level testing device 25, for example the arrangement shown in FIG. 4e. Device 25 consists of a sequence control 32, which controls both the cycle generation for the antenna reversal 33 and the level comparator 10 for finding the most favorable reception level 5 ($P_{xmax}$), as well as a reversing switch for issuing the reversing signal 23. The maximum signal level switching position $S_{max}$ 37 is determined and issued as the reversing signal 23, with the help of an addressable antenna reversal 34, an addressable memory 35 for the reception level $P_x$ 30 of the xth antenna, and level comparator 10.

Thus, the antenna diversity system of the invention for both types of modulation, in the presence of the highest possible data during the selection process for selecting the most favorable reception signal 5, reduces the probability of any level fading events in the best possible way.

This is illustrated again in the representation of FIG. 3a. With each selection of a favorable reception signal 5 at the beginning or end of a transmitted symbol, with COFDM modulation of its $N_c$ number of sub-carriers, the number of $2 \times N_c$ bits with a good signal-to-noise ratio is transmitted with each symbol, i.e. in the course of the FDM symbol duration Tsf. With an M-PSK modulation of the HF carrier in FIG. 3b, an R number of level tests takes place in symbols successively transmitted in time within the selected test cycle time spacing $T_z$. If this spacing is selected equal to the FDM symbol duration $T_{sf}$, about the same amounts of information are transmitted with both types of modulation within the same time spans.

The level distributions of three antennas are schematically shown in FIG. 2 based on the relative distance s/λ. These distributions are caused by unavoidable reflections and deflections in the near range of the antenna. The curve drawn denotes the maximum level available in each case when the most favorable reception signal 5 is selected. In the scale below FIG. 2, the sequence of the test cycle time spacings $T_z$ is shown at an assumed driving speed of 100 km/h. On the average, level fading events occur with high probability every half wavelength. With an FDM symbol duration $T_{sf}$ of 250 μs, an adequate number of about ten symbols therefore is about half a wavelength. Thus it is possible to realize the thickly drawn level curve in the signal gain. As shown above, this dimensioning permits at Z=5 a driving speed of about 175 km/h.

Figure 5A:
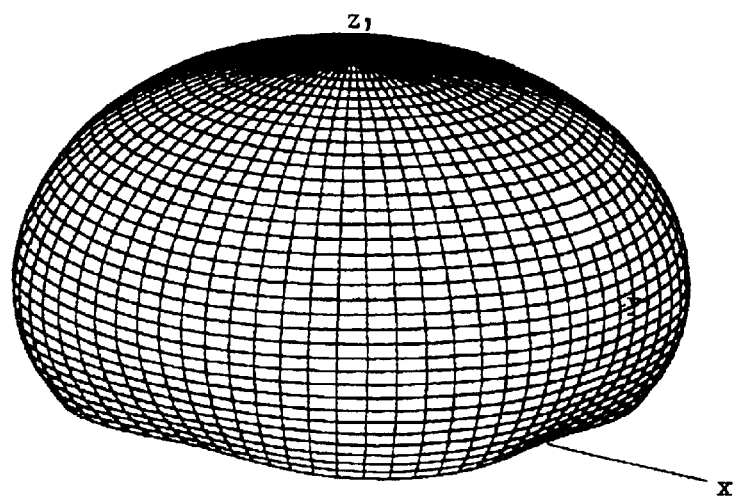
FIG. 5a shows a three-dimensional omnidirectional direction diagram for circular polarization of an antenna suited for satellite radio service.

In FIG. 5a, the antenna arrangements 20 are explained for antenna diversity systems of the invention. FIG. 5a shows a three-dimensional, almost omnidirectional diagram for the circular polarization of an antenna suited for a satellite service. This antenna will largely meet the desired requirements if it is mounted on a plane plate (FIG. 8a). To illustrate the effects which an invisible mounting of an antenna on the vehicle has in view of the directional diagram, FIG. 5d shows the deformation of the vertical diagram of the directional diagram shown in FIG. 5a if the respective antenna is mounted in a tub-like deepening 58 as shown in FIG. 5d. The specified antenna gain is not reached especially in the angle range of low elevation (see FIG. 5d). To overcome an oppositely disposed shading by walls, it is possible, for example to use a sectoral directional diagram 9 in the form shown in FIG. 5e. A number of such sectoral directional diagrams 9 are necessarily required for covering the entire azimuth.

Accordingly, it is shown that the specified directional diagram of the antenna gain cannot be reached with a single antenna in many sites of installation that are favorable under vehicle-specific aspects. However, according to the present invention, it is possible to design several individual antennas having different sectoral directional diagrams 9 with the main directions 29 pointing in different three-dimensional directions. This is shown by way of example for 5 different directional antennas in FIG. 5b. If the covering surface is formed over all diagrams, a diagram as shown in FIG. 5c is obtained, in which the radiation is raised in the areas of small elevation angles by the increased directional effect of the individual antennas. It is shown, furthermore, that it is hardly possible to produce at reasonable cost, an ordered circular polarization for the sectoral directional diagrams 9 for antennas inconspicuously integrated into the vehicle. The invention provides that increased sectoral directional effects are produced, so that the 3 dB loss, due to the omission of circular polarization is compensated for, or overcompensated.

Figure 6:
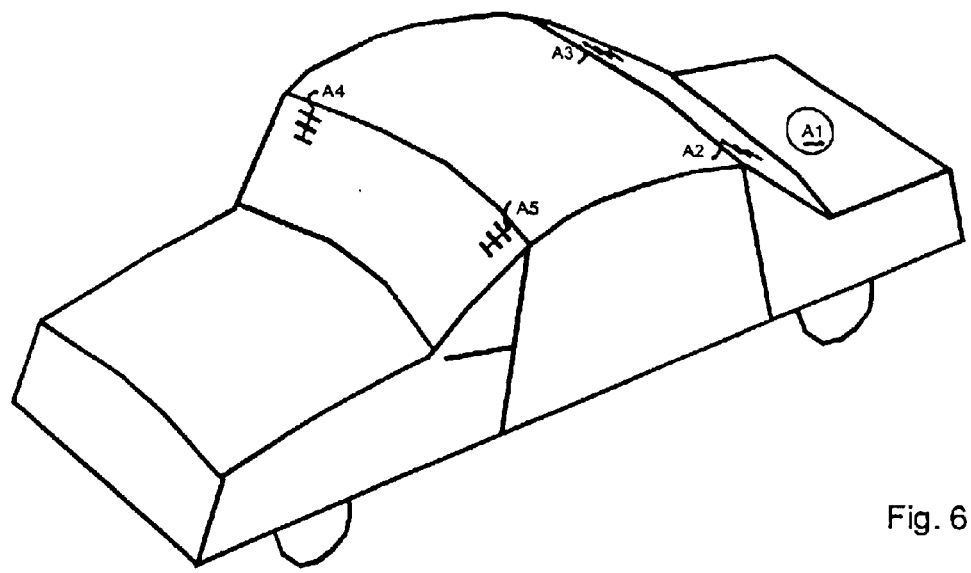
FIG. 6 shows an antenna system of the invention with a single antenna on the trunk lid, and additional antennas integrated in the body of the motor vehicle.

In FIG. 6, an embodiment of an antenna A1 is shown with the specified directional diagram based on the measuring plate, and mounted, for example on the trunk lid or under a plastic trunk lid. Because of the shading caused by the rear window and the roof of the vehicle especially in the area of low elevation, this area is filled in according to the invention by the additional antennas A4, A5. As indicated, for example in FIG. 6, these antennas may be mounted on the windshield as directional antennas. With the given dimensions of the vehicle, the differences in traveling time attendant to such a decentralized system, with the cable leading to the logic circuit device 2, has no influence on the signal following decoding. With a flat slant of the window panes, the entire antenna system 1 can be provided on these window panes using only directional antennas A2, A3, A4 and A5.

Figure 7:
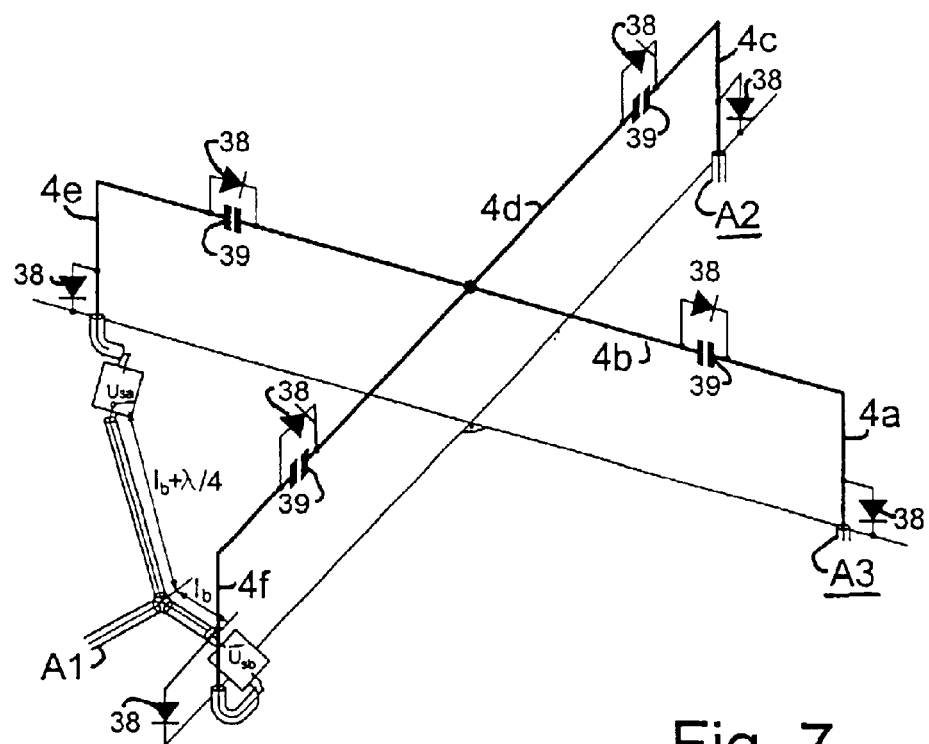
FIG. 7 shows individual antennas of the invention with the switching diodes and capacitive elements.

FIG. 7 shows an antenna system 1 of the invention with a low structural height. This antenna substantially has two crossed frame structures in which the impedance elements 39 are integrated so as to adjust the directional diagram, which to a large extent, corresponds with the specified directional diagram with circular polarization when diodes 38 are switched to blocking. Several sectoral directional diagrams 9 are alternately adjusted to fill up the covering surface by other settings of switching diodes 38.

A completely covered installation of antennas is often required in motor vehicles. FIG. 8a shows a tub-like deepening or trough 58 provided for this purpose in the conducting body of the vehicle, which is provided with a plastic covering. In an advantageous embodiment of the invention, a patch antenna A1 is mounted in the center of the tub on its bottom 64 for covering the steep radiation. Additional patch antennas are mounted on the correspondingly slanted tub walls 63 for creating the sectoral directional diagrams 9.

Figure 8B:
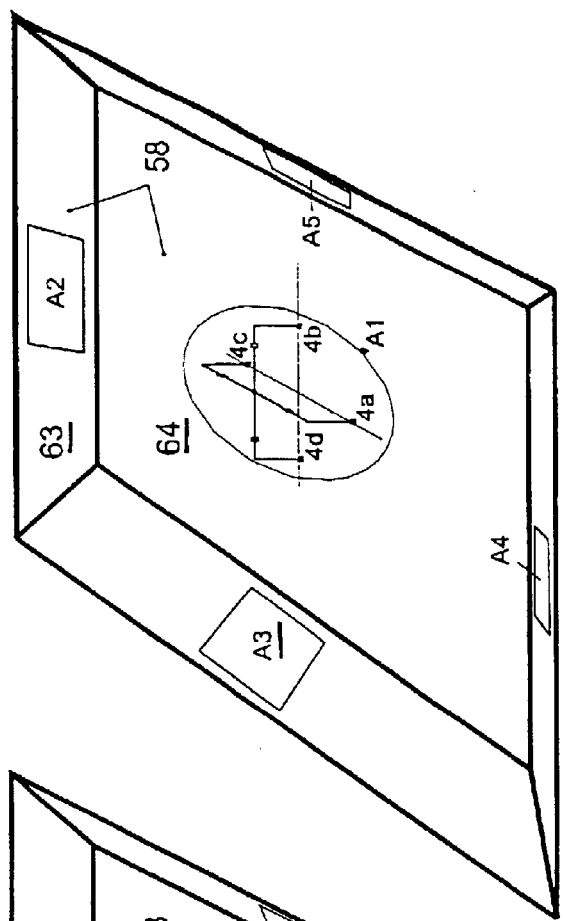
FIG. 8b shows the same system as FIG. 8a, but with a single antenna similar to FIG. 7.
Figure 8A:
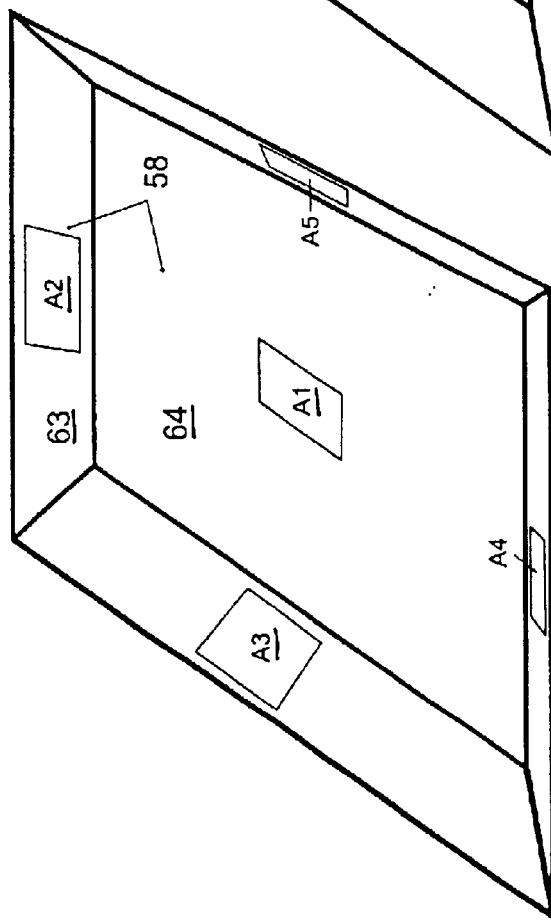
FIG. 8a shows an antenna system disposed in a metallic, tublike trough.

To enhance the directional diagrams for steep radiation, the antenna of FIG. 7 is used in the center of the tub of FIG. 8b instead of the patch antenna A1, without diodes 38.

Figure 9A:
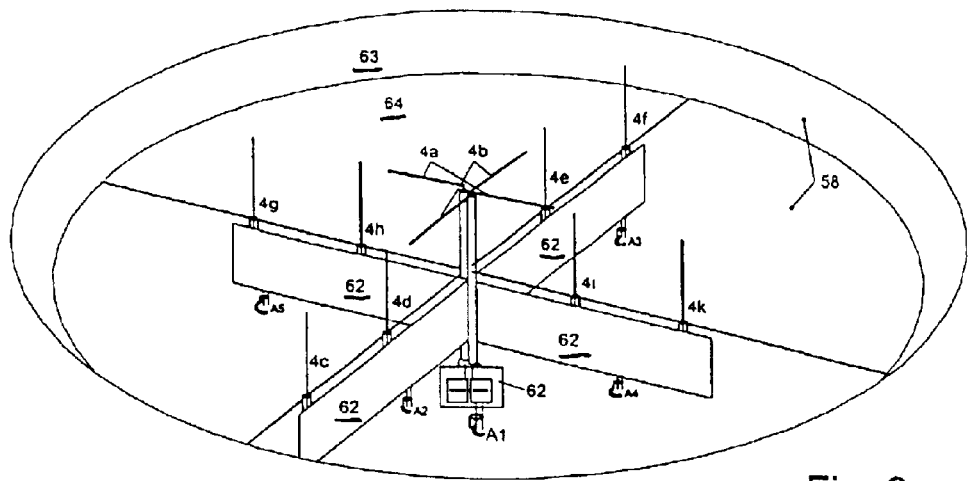
FIG. 9a shows another antenna system designed as a horizontal crossed dipole in a metallic, tub-like trough.

FIG. 9a shows a circular tub-like deepening 58, with two crossed dipoles formed from the antenna components 4a and 4b, and disposed in the center, above the bottom surface 64 of the tub, with a spacing from the bottom. To enhance the radiation for low elevation signals, two vertical group antennas formed from antenna components 4c, 4d, 4e, 4f and 4g, 4h, 4I and 4k, are arranged at an angle of 90 degrees in relation to one another.

Figure 5B:
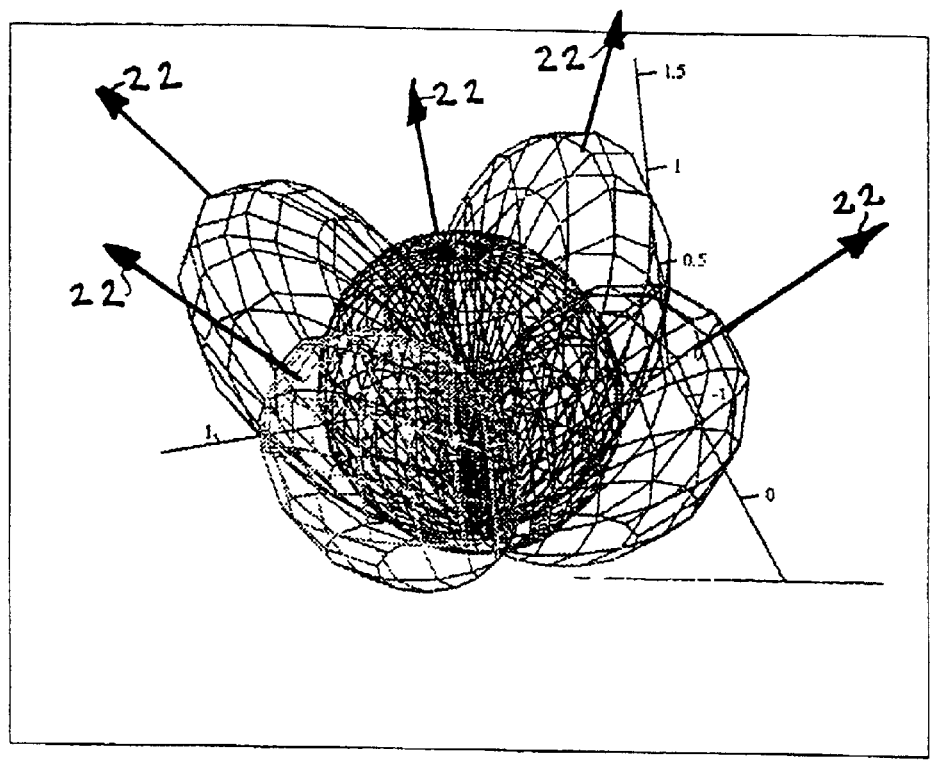
FIG. 5b shows a three-dimensional directional diagram of a reception system with the different main reception directions.
Figure 5C:
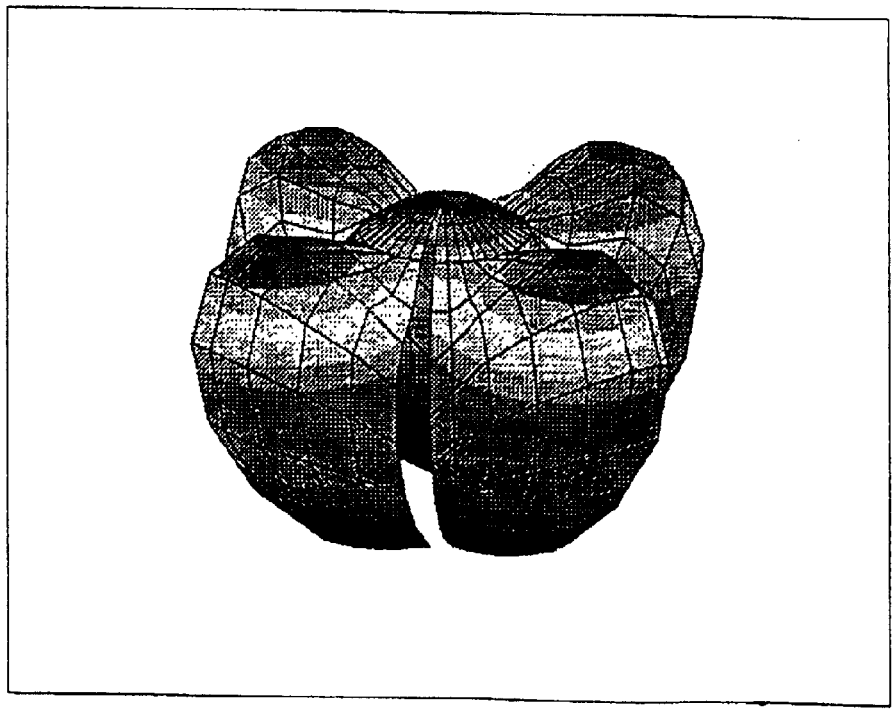
FIG. 5c shows a cover surface that can be adjusted with a reception system for the required antenna gain with circularly polarized waves.
Figure 5D:
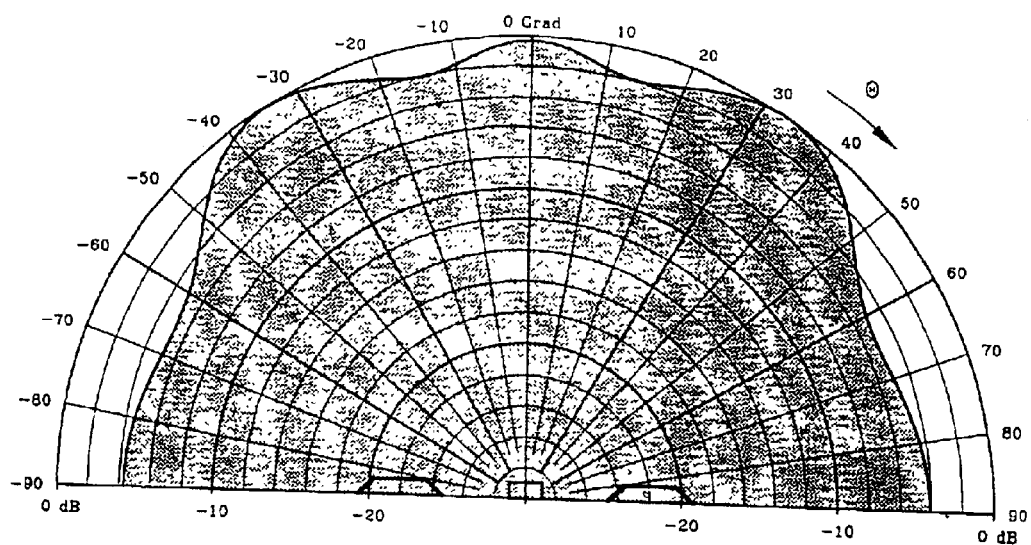
FIG. 5d shows the deformation of the vertical diagram of an antenna originally mounted on a conductive plate.
Figure 5E:
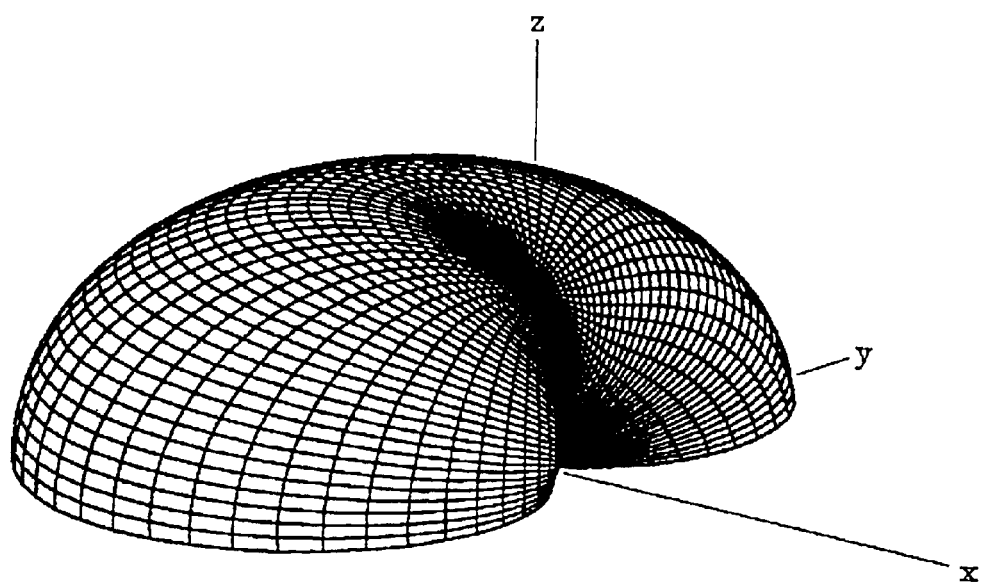
FIG. 5e shows the three-dimensional diagram with a single antenna with sectoral illumination.
Figure 9B:
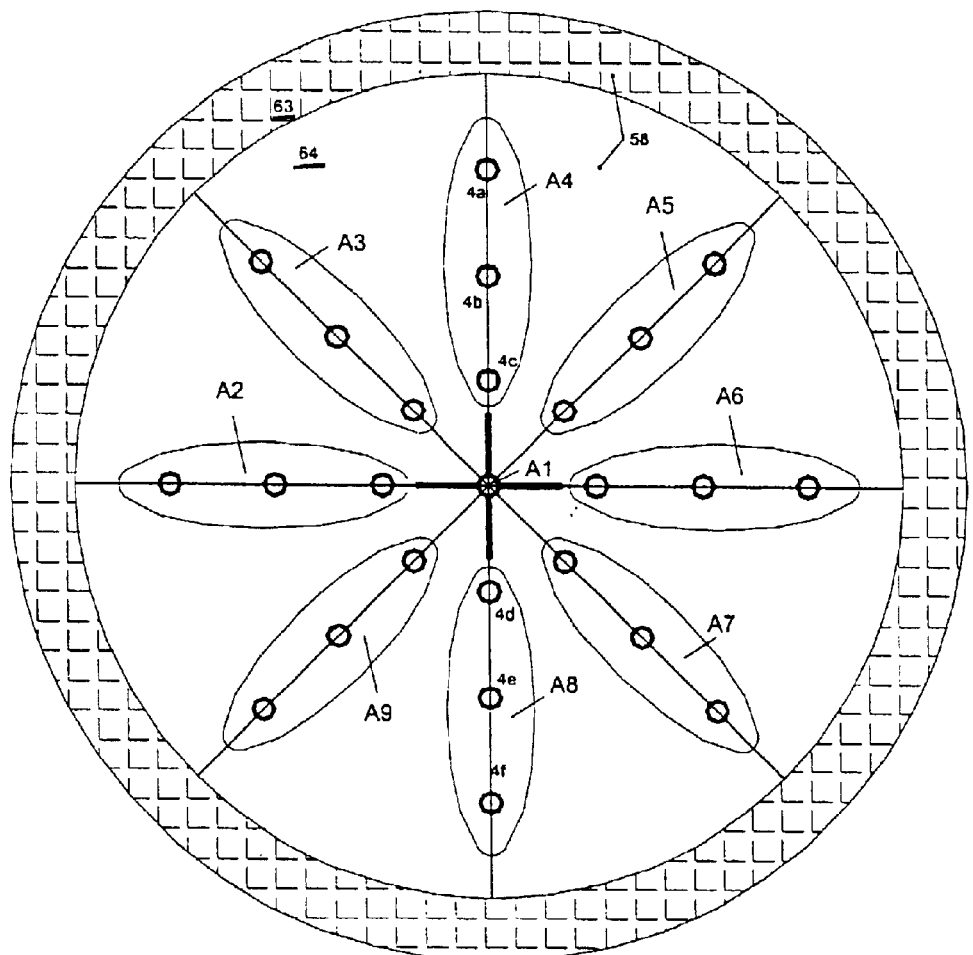
FIG. 9b is a top view of a recessed antenna system that has 8 individual antennas in the form of a star.

Their antenna signals are fed to a network 62 with the individual antenna connections A2 and A3, and respectively, A4 and A5, for switching the signals together, for forming the sectoral directional diagrams 9 for the four azimuthal main directions 22 (see FIG. 5b). With the help of the increased directional effect of the group antennas for low elevation, the shading caused by the slanted tub walls 63 is cancelled or overcompensated. FIG. 9a shows another embodiment of an antenna system, designed as a horizontal crossed dipole, in a metallic trough 58. It has a single antenna A1, designed in the form of a horizontal, crossed dipole, and with the antenna components 4c and 4d of an individual antenna A2 formed via a network 62 for switching the antennas together, and with the individual antennas A3 to A5 formed in a similar way. The antenna system 1, shown in FIG. 9a can be advantageously expanded in the same sense to form the antenna system 1 shown in FIG. 9b, which provides a greater number of sectoral directional diagrams 9. Depending on the site where this antenna system 1 is mounted, and the signal shading caused by the vehicle, antenna system 1 can be equipped with group antennas that are asymmetrically arranged in the center.

Figure 10A:
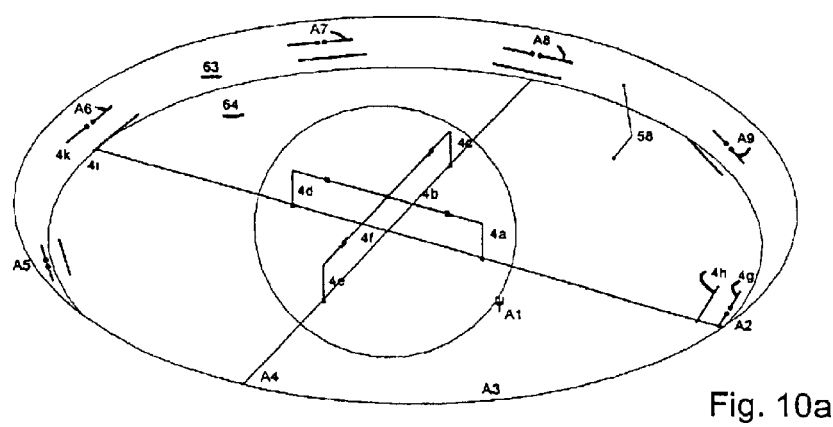
FIG. 10a shows an arrangement of recessed individual antennas similar to FIG. 7.

FIG. 10a shows another advantageous embodiment of an antenna system 1 of the invention. Here, the slanted tub walls 63 are used as reflectors of the group antennas A2 to A9, with the horizontally polarized antenna components 4h and 4g, mounted on the walls with a spacing from the latter. An antenna as shown in FIG. 7 can be used in the center, selectively also without the diodes 38.

Figure 10B:
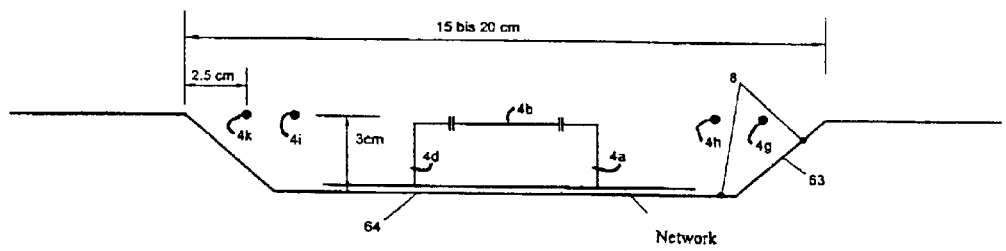

FIG. 10b shows the cross section through the tub-like deepening or trough 58, with the arrangement of the group antennas, and antenna A1. The dimensions shown in the figure apply to a antenna system 1 used at 2.3 GHZ. The optimal directional diagram 9 available with one of the group antennas can be obtained through optimal angles of inclination of the slanted tub walls 63, and through the positioning of the horizontally arranged antenna components 4g, 4h, 4i and 4k in the plane of the surface of the body of the vehicle.

Especially in the field of automobile building, high-frequency line connections contribute substantially to the overall costs of a receiving system. It is therefore necessary that the expenditure for cables be kept as low as possible. To enhance the reception reliability, in connection with known satellite radio systems, a receiver 3a' can be provided as shown in FIG. 1d, with another reception branch, for signals with QPSK modulation, transmitted by another satellite for the simultaneous and coordinated reception of the radio signals transmitted by the first satellite on a high-frequency band that is close in terms of frequency. The separate HF-ZF components 42a and 42a' are provided (see FIG. 1e) in the receiver for both high-frequency bands, which are supplied with the same signals via a common high-frequency cable 21a between the antenna arrangement 20 and the receivers 3a and 3a'. One high-frequency cable can be saved in this way. To create the diversity function, the reception levels 30a and 30a' are supplied to the reception level testing device 25a, where they each are compared in a level comparator 10 with a threshold value for reliable symbol identification. The binary output signals of both level comparators are supplied to a logic circuit 27, (FIG. 1e) which, via a reversing command addressed to logic circuit device 2a, effects the allocation of another antenna signal, if only one of the two satellite signals is received with a lower-than-required minimum level, for the purpose of reliable symbol identification, i.e. if both threshold values are not exceeded.

In another advantageous embodiment of the invention, logic circuit 27 contains a memory that makes it possible to avoid unnecessary reversals with the help of preceding level tests, if the number of satellite signals received for reliable symbol identification above the minimum level is the same. The system thus is capable of always selecting with minimal switching activity, the one antenna signal with which the greater number of the two satellite signals can be received. This is particularly very advantageous if only two antennas are present in the antenna system 1, such as for example, one in the front area and one in the rear area of the vehicle. Although the separate selection of the antenna signal most favorable for the reception of each satellite signal is not possible with only one common switching device 2a and one common high-frequency cable, in the case of two antennas, for example, diversity efficiency of two antennas is separately obtained in each case, for each satellite signal.

In another advantageous, further developed embodiment of the invention, the two symbol cycle signals 18a and 18a' are transmitted to the reception level testing device 25a, and supplied there to logic circuit 27. If one of the two satellite signals turns out to be unworthy of reception, the reversing process initiated thereby is changed in another advantageous embodiment of the invention into a reception signal that is worthy of reception, which is initiated at a reversing point that is harmless in terms of time. According to the invention, this reversal thus takes place linked to the symbol cycle of the signal worthy of reception at that moment.

Figure 11A:
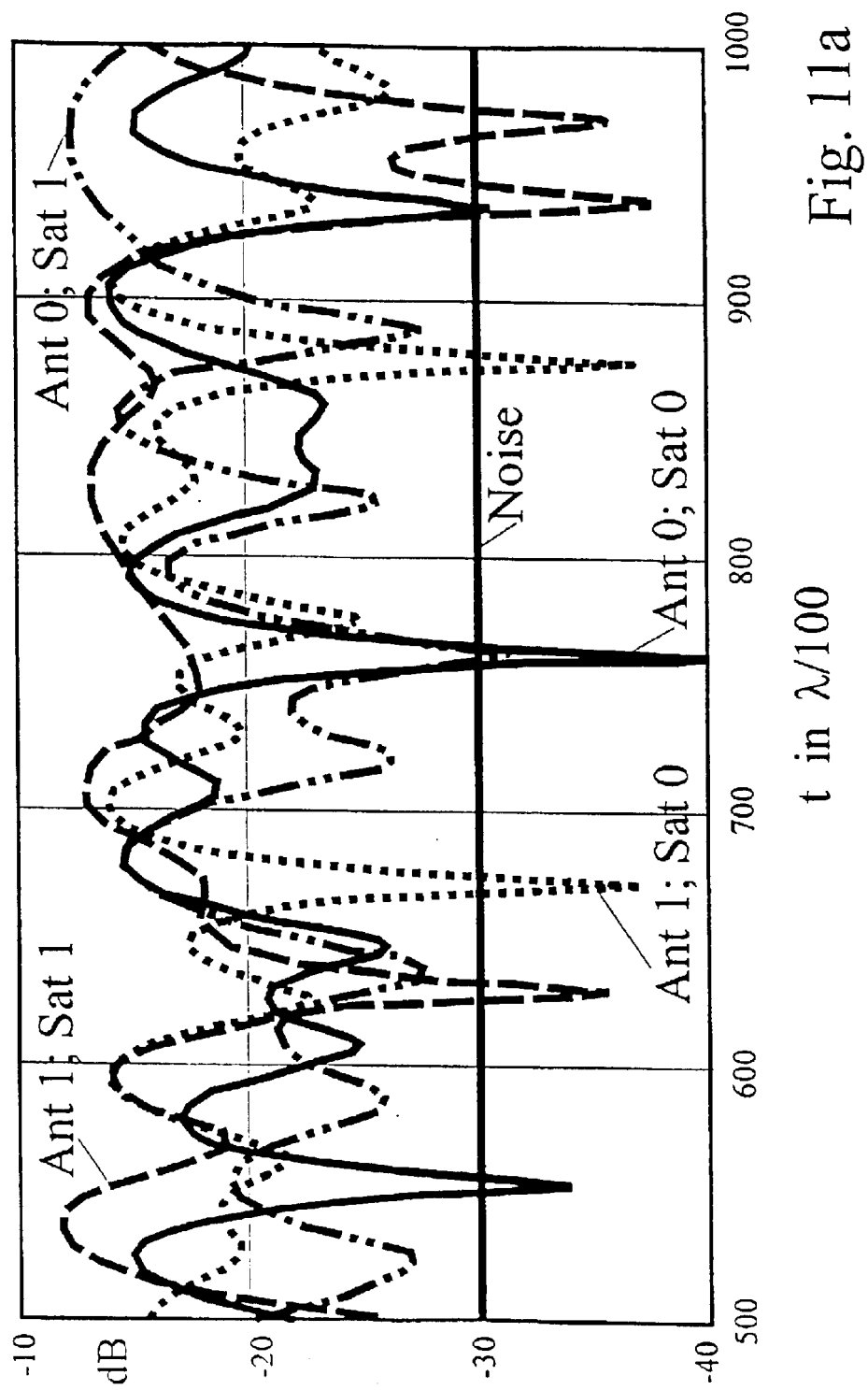
FIG. 11a shows four reception signals in the Rayleigh reception field plotted over distance.

To explain the mode of operation of this system with only two antennas, FIG. 11a shows four reception signals in the Rayleigh reception field plotted over the distance. The curves of these signals denoted by 0 and 1 represent the reception signals of an antenna denoted by 0, and of a satellite denoted by 1. Accordingly, the curves denoted by 2 and 3 represent reception signals of an antenna denoted by 0, and of a satellite denoted by 1. With a corresponding antenna arrangement, the reception signals of both antennas transmitted by a satellite are uncorrelated from each other. Because of the different ways of propagation, the level curves of the two satellite signals of one receiving antenna each are uncorrelated as well. All level curves shown in FIG. 11a thus are uncorrelated and the drops below the minimum reception level (noise in FIG. 11a) required for safe symbol identification largely occur independently of one another.

Figure 11B:
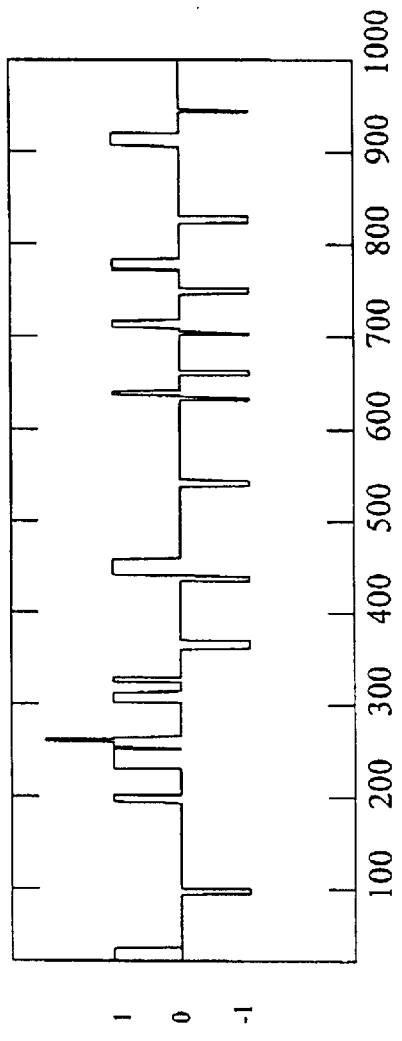
FIG. 11b shows the difference between satellite signals received by antenna 1 vs signals received by antenna 0.

If the number of the satellite reception signals worthy of reception received with the antenna 1 is deducted from the corresponding number of satellite reception signals worthy of reception received with the antenna 0, the curve over the distance shown in FIG. 11b is obtained for this difference. If the logic circuit 27 is designed, for example so that it selects the antenna 0 in points of positive difference values, and the antenna 1 in points of negative difference values, but no further switching of logic circuit device 2a is initiated when the difference is disappearing, the curve of the switched-on antenna shown in FIG. 11c over the distance is obtained, whereby the logic 1 denotes the switch-on of the antenna 0 and the logic B1 denotes the switch-on of the antenna 1. If ps is the probability for a satellite reception signal for falling short of the required minimum reception level, then one obtains with the diversity efficiency found of n=2 for each signal, a substantially smaller probability for falling short of the required minimum reception level in the diversity operation of:

$$Pd=Ps^n=Ps^2$$

In another advantageous embodiment of the invention, more than two reception signals, which are emitted on frequency bands that are close to each other, are transmitted only over one high-frequency cable between antenna arrangement 20 and receiver 3a'. Branching of the signals to the various HF-ZF components 42a, 42a', 42b associated with the frequency bands advantageously takes place in the interior of receiver 3. This arrangement can be employed, for example in connection with a satellite radio system with additional terrestrial support, such as the system SDARS in the frequency range around 2.33 GHz. In this an antenna diversity system, the antenna arrangement 20 only contains one switching device 2 with a reception level testing device 25 associated therewith. The latter is supplied both with all of the symbol cycle signals 18a, 18a' and 18b associated with the various frequency bands, and the reception levels 30a, 30a' and 30b. The level comparator and a logic circuit 27 with memories are contained in the latter.

A particular low expenditure of high-frequency cables is achieved with this system, if an arrangement 20 is realized on the vehicle in a confined space, so that feed cables between the gates supplying the various antenna signals and leading to the logic switching device 2 are made as short as possible. These arrangements are shown by way of example in FIGS. 7 to 10b. With the help of the memory present in logic circuit 27, it is possible with the help of the sequentially successive switching positions of logic switching device 2 to test the reception worthiness of all signals received, i.e. of the two satellite signals and the terrestrial signal. Moreover, it is possible at any time to adjust the switching position of logic switching device 2 that results in the greatest number of signals worthy of reception among the three signals to be received. The system adjusts itself in this way dynamically to the reception situation that is constantly changing in the course of driving. Therefore, with the antennas used, it is possible to waive any meticulous adherence to the requirements with respect to the directional diagram of an antenna without antenna diversity for this radio transmission.

Figure 12:
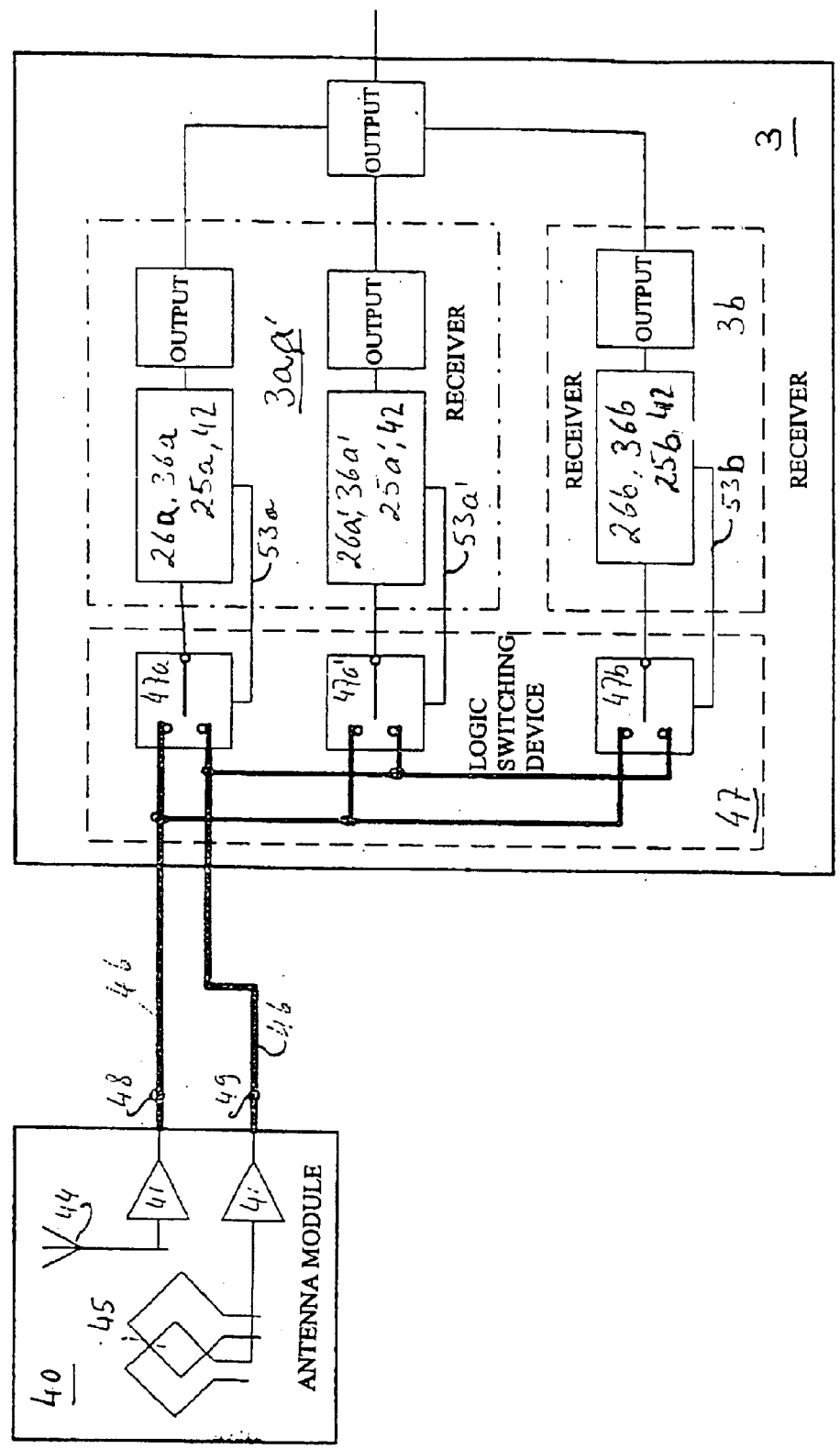
FIG. 12 is a schematic diagram of a of a diversity reception system for receiving satellite and terrestrial signals.

FIG. 12 shows a standard antenna module 40 that has a separate connection for terrestrial signals 48, and for satellite signals 49. This antenna module is described in Patsiokas et al: XM satellite; SAE 2001-01-1328; ISSN 0148-7191, 3/2001, incorporated herein by reference. Antenna module 40 contains two antenna combinations for circular polarization 45 and one elementary antenna for vertical polarization 44. A plurality of high frequency reception lines 46 connect antenna module 40 to a receiver 3.

Receiver 3 has a plurality of receiver inputs feeding into a plurality of logic switching devices 47a, 47a', and 47b for switching between the received information from the connection for terrestrial signals 48, and the connection for satellite signals 49. Thus, a modified standard receiver 3 has a plurality of HF-ZF components 42 for every satellite channel, and for a terrestrial channel with separate reception level test devices 25a, 25a', 25b.

There are also a plurality of reception signal level indicators 36a, 36a' and 36b which are assigned to each of the channels of the receiver which work along with the reception level test devices 25a, 25a', 25b to control the logic switch devices 47a, 47a', 47b at the receiver input, through their control connections 53a, 53a' and 53b respectively to provide a reversing or feedback signal to switch devices 47a, 47a' and 47b.

Receiver 3 has separate HF-ZF components 42 for every satellite channel and terrestrial channel with separate reception level test devices 25 for controlling one logic switching device 47, respectively, at the receiver input. The input of the receiver is thus modified through logic switching device 47 with the correspondingly assigned logic switching devices 47a, a', b, so that two signals, that are independent of each other, are available for every satellite channel and terrestrial channel through a selection of a signal present at the connection for terrestrial signals 48 or at the connection for satellite signals 49. Due to the decorrelation of the signals present at these connections in each of the bands, a diversity efficiency of $n_{s1}=2$, $n_{s2}=2$ or $n_t=2$ of 2, respectively, is present for each of the satellite channels or the terrestrial channel in the receiver, so that $\Delta n_{ges}=3 \cdot 2-3=3$ results.

The invention shown in FIG. 12 therefore provides a diversity antenna system for receiving satellite and terrestrial signals having an efficiency of $n_{SDARS}=3$. Thus, the cost connected with antenna diversity is relatively low when compared to the normal cost at the receiver side.

The logic switching device at receiver input 47 can be installed at low cost at the input of the receiver. Expensive high frequency lines 46, can be used with this design with no additional line costs to the vehicle.

If an area in the vehicle is shielded or shadowed, a standard available antenna module 40 can, for example, be mounted in the front area and additionally in the rear area of the vehicle wherein the separate antenna modules have separate outputs for terrestrial and satellite signals. This equipment is especially advantageous for vehicles without a solid roof, such as convertibles.

Figure 13:
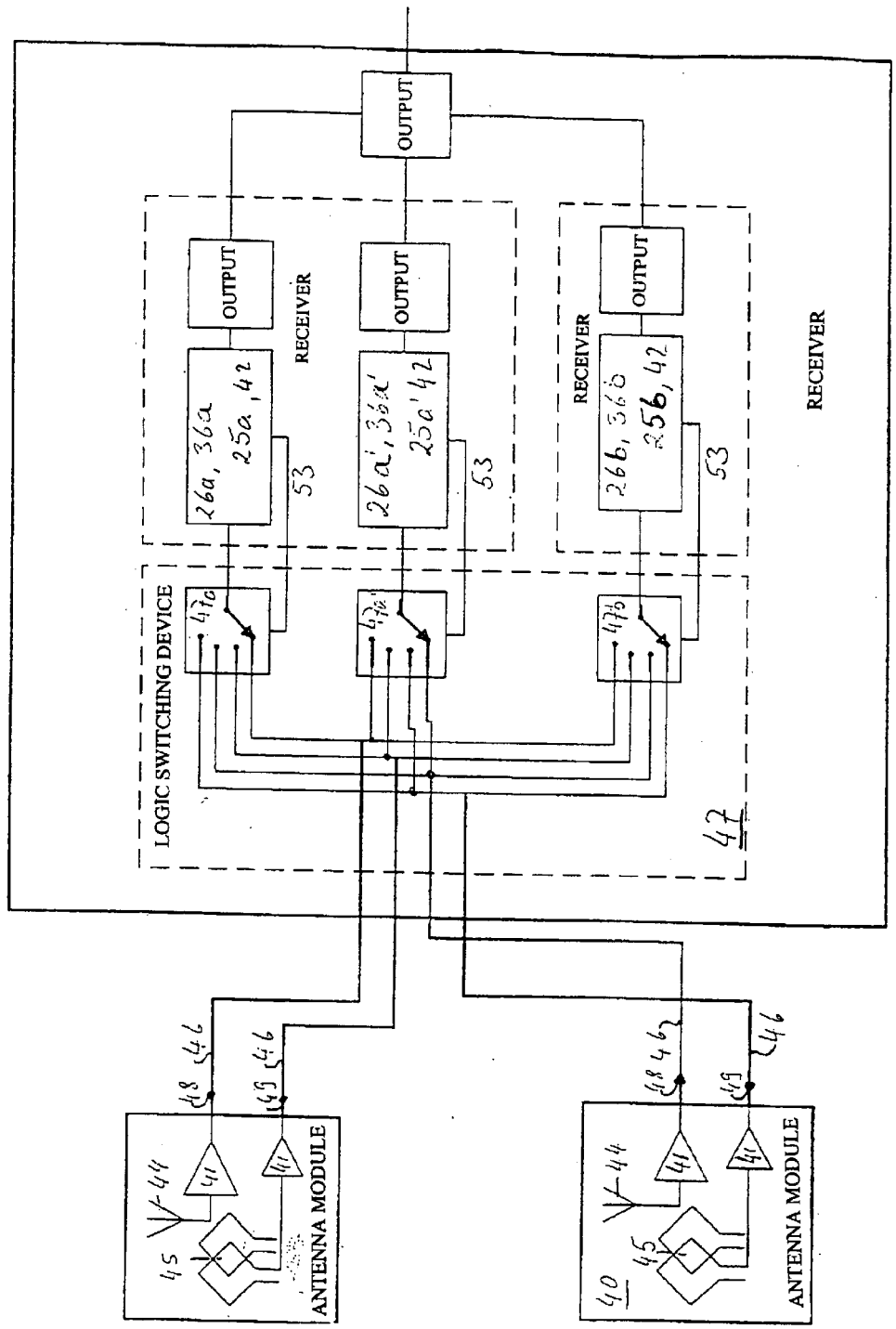
FIG. 13 is a schematic diagram of another embodiment of a diversity reception system for receiving satellite and terrestrial signals having two standard antenna modules.

FIG. 13, shows a modified SDARS receiver having two antenna modules 40, and a plurality of high frequency reception lines 46 coupling antenna modules 40 to a plurality of logic switching devices 47a, 47a', 47b. Each of these logic switching devices 47a, 47a' and 47b have four high frequency inputs with separate access of all channels to all signals that are available to both of the antennas.

Because of the decorrelation of all of the signals, which are each available separately for all channels and are delivered by the antennas, an efficiency of $\Delta n_{ges}=3 \cdot 4-3=9$ results because of the antenna diversity. However, this high additional diversity efficiency requires the use of more expensive high frequency lines 46 to the satellite receiver.

Figure 14:
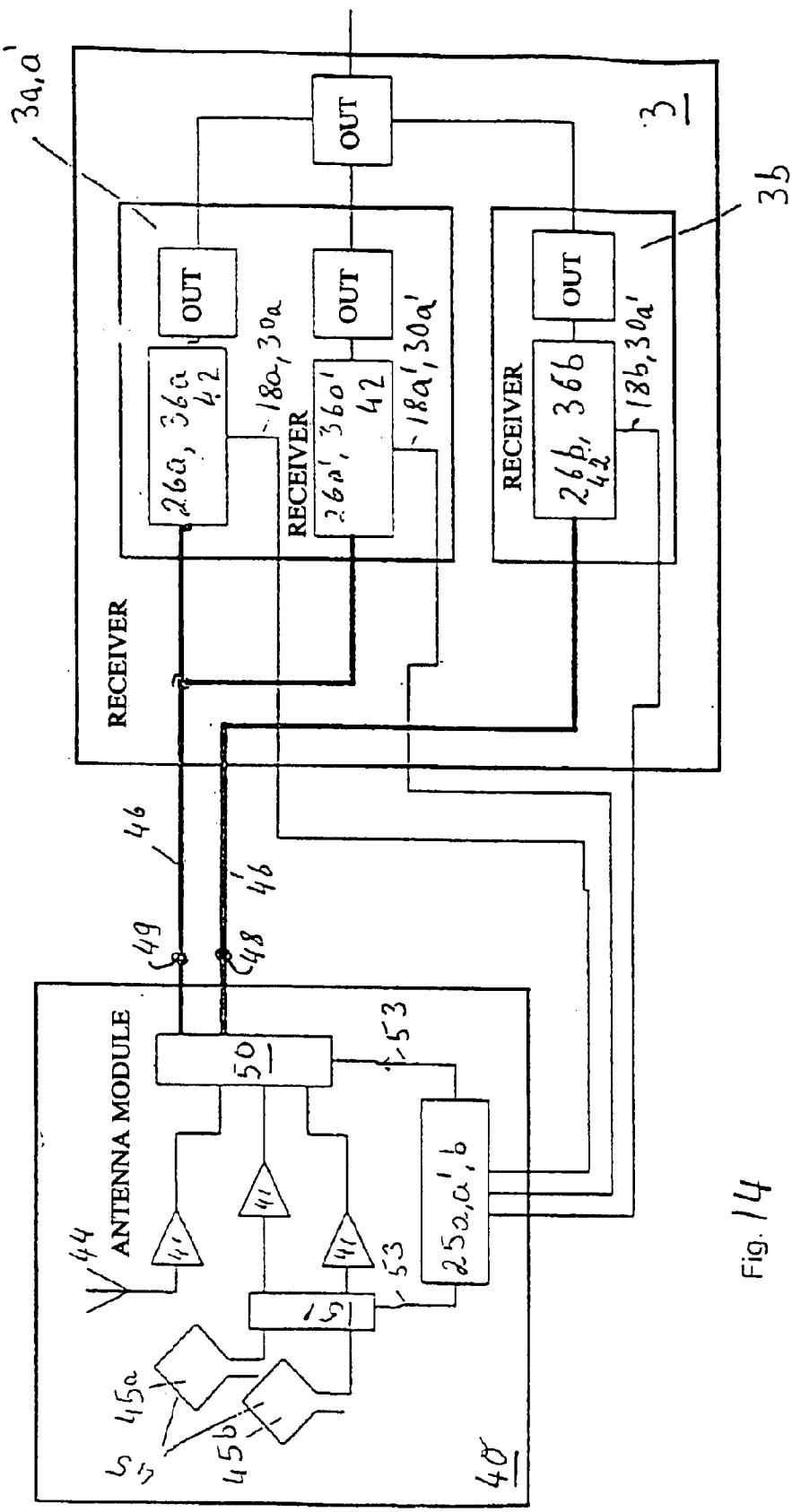
FIG. 14 is a is a schematic diagram of a diversity reception system for receiving satellite and terrestrial signals having a modified antenna module.

FIG. 14 shows another embodiment having a slightly modified standard available receiver 3 with two high frequency inputs 48 and 49. In this design, antenna module 40 has a reversing switch 51 coupled to the antenna combination for circular polarization 45 containing a first elementary antenna 45a and a second elementary antenna 45b. There is also a logical switching device 50 disposed in antenna module 40 in communication with elementary antenna for vertical polarization 44, reversing switch 51 and reception level testing devices 25a, 25a' and 25b.

For each of the channels, only the symbol cycle signal 18 and the reception level 30, respectively, are freed from the receiver. They are fed through less costly conductor lines to reception level test devices 25a, 25a' and 25b in module 40. Reversing switch 51 in antenna module 40 allows the separate access to first elementary antenna (45a) and also to second elementary antenna (45b), as well as to the antenna combination for circular polarization 45 itself. These signals, together with the signals that are incorporated by the elementary antenna for vertical polarization 44 through the logic switching device 50, will be fed to the connection for satellite signals 49, alternatively and independently of each other.

Figure 11C:
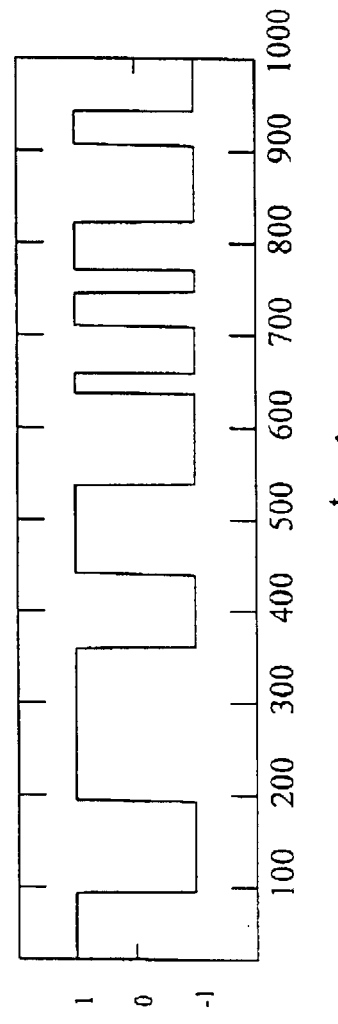
FIG. 11c shows a curve of the switching function of antenna 1 and antenna 0 over distance.

Independent of the signals at the connection for satellite signals 49, these signals are likewise available to the connection for terrestrial signals 48, depending upon feedback signal 53 for selection. As a result, the signal fed to the HF-ZF component 42b for terrestrial reception is selected from the four signals formed with the largest amplitude. The partial correlation of the signals between one of the elementary antennas 45a, 45b and the signal at the antenna combination 45 for circular polarization 45b itself, results in a diversity efficiency of $n_t=3.2$ for the terrestrial path. FIG. 11a, FIG. 11b, and FIG. 11c, show that the signal at the connection for satellite signals can be selected through the control of the diversity system, so that the signal at the connection for satellite signals 49 has the largest number of both satellite signals that exceed the minimal voltage. For both satellite channels, a smaller diversity efficiency of $n_{s1}=n_{2s}=2.5$ results. The whole diversity efficiency is $n_{ges}=n_t+n_{s1}+n_{s2}=8.2$ and $\Delta n_{ges}=5.2$. Thus, arrangement, which has only a very small cost modification in the standard receiver, results in high diversity efficiency via electronic measures in the antenna module 40. Antenna module 40 has HF-antenna amplifiers 41 for the decoupling of antenna combination for circular polarization 45, elementary antenna vertical polarization, or for the compensation of performance partitions or performance attenuations.

Figure 15:
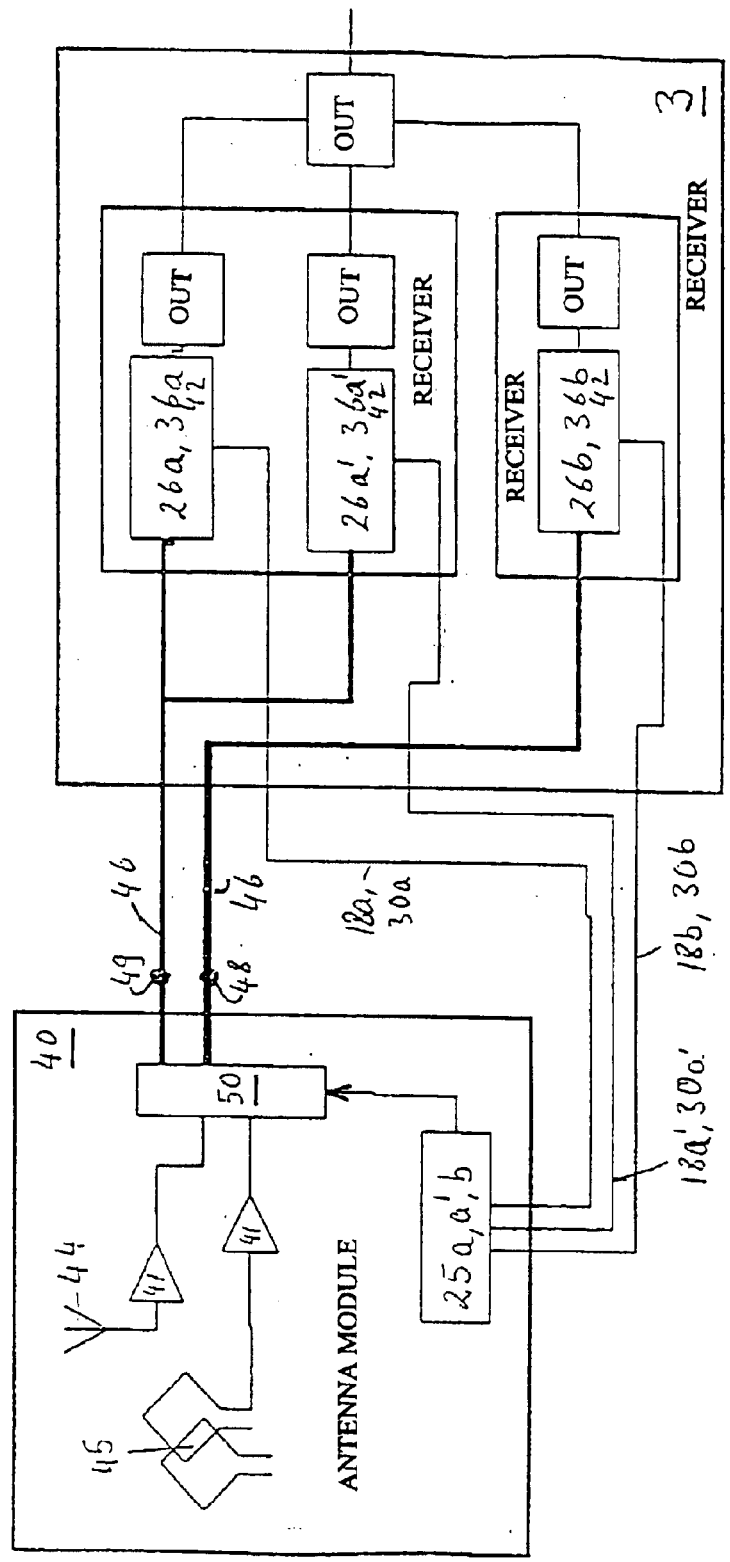
FIG. 15 is a schematic diagram of a diversity reception system for receiving satellite and terrestrial signals having a second modified antenna module.

FIG. 15 shows another embodiment of the invention wherein receiver device 3 is identical with the one in FIG. 14. However, this embodiment has a lower cost antenna module 40. This antenna module has a separate connection for terrestrial signals 48 and a connection for satellite signals 49. Antenna module 40 has elementary antenna for vertical polarization 44 and antenna combination for circular polarization 45 disposed therein and connected to logic switching device 50 via HF amplifiers 41. Antennas 44 and 45 feed signals at the output of the satellite path and at the output of the terrestrial path to logic switching device 50 to the connection for terrestrial signals 48 and to the connection for satellite signals 49, respectively. The selection of signals from the terrestrial path or satellite path in the antenna module 40 occurs by controlling logic switching device 50 via reception level test devices 25a, 25a', and 25b which is coupled to logic switching device 50 and to receiver 3. The difference to the arrangement in FIG. 14 results for the small number of signals available in the antenna. This is because the optimal signals for the two satellite channels, and the terrestrial channel, are available independent of each other both at the connection for satellite signals 49 and at the connection for terrestrial signals 48.

Due to the decorrelation of the signals at the connection for terrestrial signals 48, a diversity efficiency of $n_t=2$ results for the terrestrial path. For the reasons mentioned, a smaller diversity efficiency results for each of the two satellite channels $n_{s1}=n_{s2}=1.7$. The total diversity efficiency is thus $n_{ges}=n_t+n_{s1}+n_{s2}=5.4$ and $\Delta n_{ges}=2.4$. This design focuses on cost efficiency, because in antenna module 40, there is only one additional simple logic switching device 50 above the standard antenna module. Due to the small additional cost for the antenna diversity function, and due to the considerable increase of the diversity efficiency $\Delta n_{ges}=2.4$, this arrangement appears to be especially advantageous.

Figure 16:
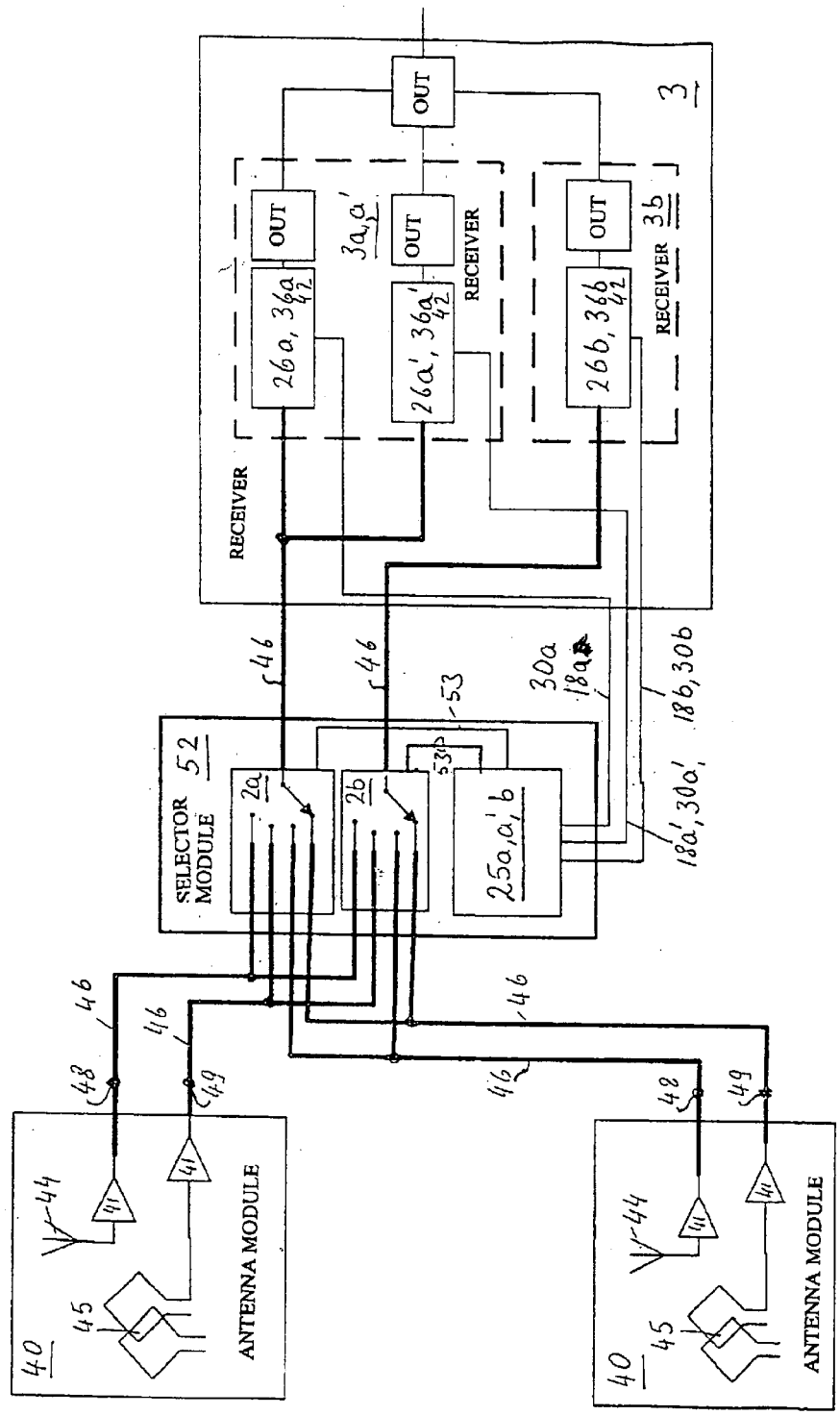
FIG. 16 is a schematic diagram of a diversity reception system for receiving satellite and terrestrial signals having two modified antenna modules a selector module and a receiver.

In the interest of a favorable shift of the high frequency lines 46 in the vehicle, a selector module 52 should be positioned separate from antenna module 40 and receiver 3 in a favorable location on the vehicle. This is especially necessary for such vehicles that require several mounting locations, which are spaced apart from each other for construction reasons. FIG. 16 shows this type of design. This design shows the use of standard available antenna modules 40 for SDARS systems with a separate connection for terrestrial signals 48 and a connection for satellite signals 49. Selector module 52 has at least one logic switch device 2a, b present in selector module 52 for receiving signals from the connections for terrestrial signals 48 and the connections for satellite signals 49. Logic switch devices 2a and 2b are coupled to both connections 48 and 49 in both modules 40 so that logic switching devices 2a, and 2b each have four connections. Selector module 52 also contains a plurality of reception level testing devices 25a, 25a' and 25b which are in communication with logic switch devices 2a, and 2b to control the signals that are fed to receiver 3 via high frequency lines 46. Logic switch devices 25a, 25a', and 25b are also in communication with receiver 3 similar as with the device of FIG. 12.

Receiver 3 possesses, as is common in standard produced devices, one input for both satellite channels and one input for the terrestrial channel. Thus, the four antenna signals for separate and free selection are available to each of these inputs. Due to the decorrelation of all of the signals delivered by antenna, the diversity efficiency of the terrestrial channel amounts to $n_t=4$. The result is a diversity efficiency for both satellite channels, respectively, of $n_{s1}=n_{s2}=2.8$. The total diversity efficiency is therefore $n_{ges}n_t+n_{s1+ns2}=9.6$ and $\Delta n_{ges}=6.6$. This value is already achieved when the distance between the mounting location of the antenna modules 40 is small, in as far as this is not substantially smaller than one wavelength. With that the cost of high frequency lines between the modules and the selector module can be kept low.

Figure 17:
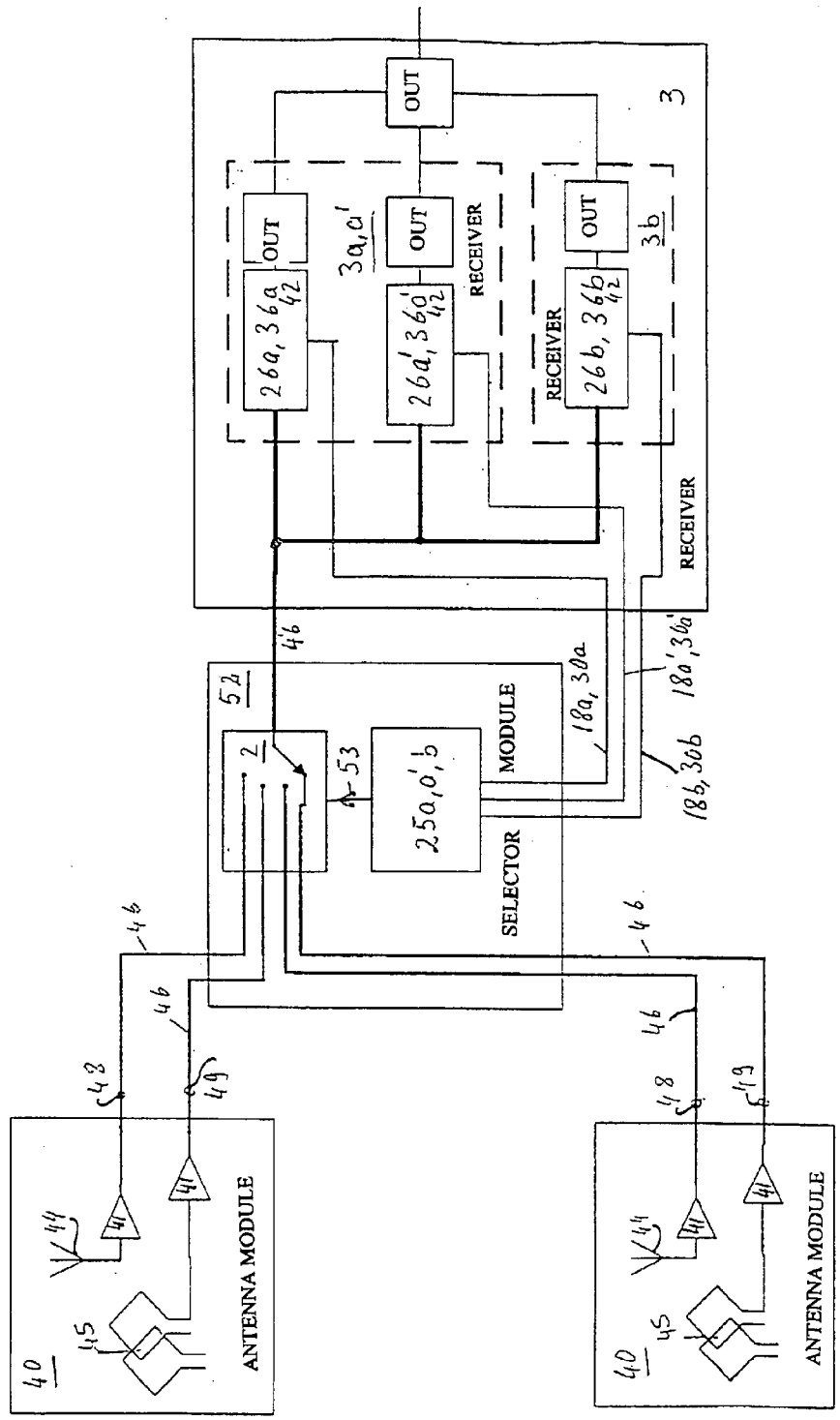
FIG. 17 is a schematic diagram of a diversity reception system for receiving satellite and terrestrial signals wherein the selector module has only one logic switching device.

In the interest of a cost reduction, standard SDARS receivers 3 are used, which have only one high frequency input for all satellite and terrestrial channels. The arrangement, which results with an advantageous use of this receiver with two standard antenna modules 40 mounted separately from each other, is shown in FIG. 17. In contrast to the arrangement in FIG. 16, a signal for the continuation of the feed to the receiver 3 is selected at all times via the reception level test devices 25a, 25a' and 25b present in selector module 52 controlling only one logic switching device 2. Thus, logic switching device 2, receives all four signals from outputs 48 and 49 associated with antenna modules 40. The signal that is selected is the one that reliably receives the largest number of the satellite and terrestrial signals. Having only one connection can result in a large savings when there is a large distance between selector module 52 and receiver 3 by reducing the amount of additional high frequency lines 46. The decorrelation of all of the signals delivered by the antennas amounts to the diversity efficiency of the satellite signals and of the terrestrial signals results in $n_{s1}=n_{s2}=n_t=2.4$. The total diversity efficiency is thus $n_{ges}=7.2$ and $\Delta n_{ges}=4.2$. Such an arrangement is then particularly advantageous if both standard antenna modules 40 are mounted close to each other, however, with respect to the wavelength mounted at a sufficient distance from each other in the vehicle. Thus, the cable connections between the antennas and the selector module 52 can be formed in a less costly way, and the cost for high frequency line 46 is small due to the single receiver input.

Figure 18:
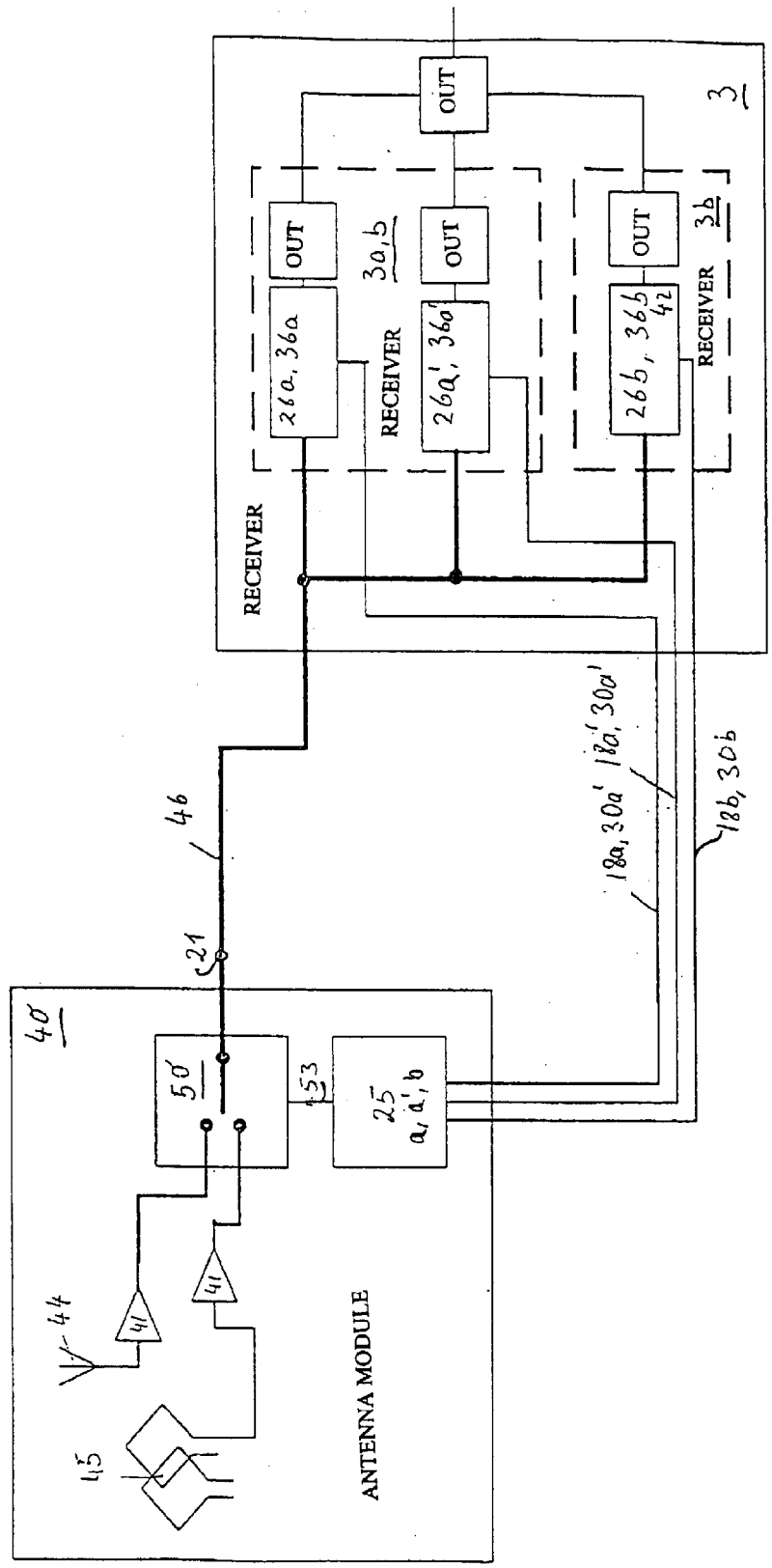
FIG. 18 is a schematic diagram of a diversity reception system for receiving satellite and terrestrial signals wherein the modified antenna module has a logic switching device.

An especially low cost diversity system as defined by the invention is shown in FIG. 18. There is shown, a standard available antenna module 40 that has been only slightly supplemented by a logic switching device 50 coupled with a reception level test devices 25a, 25a' and 25b therein. Receiver 3 is coupled to antenna module 40 via high frequency lines 46 and has only one high frequency input. The required cost through the one high frequency line 46 is correspondingly small. The signals from the terrestrial and the satellite path are alternatively available at the only antenna connection point 21. The resulting diversity efficiency for all channels amounts to $n_t=n_{s1}=n_{s2}=1.5$. Thus $\Delta n_{ges}=1.5$ results. Although the increase of the diversity efficiency through the antenna system is small in comparison to the examples mentioned, this should be compared to the small increase in cost, and appears to be perfectly justifiable in comparison for example to the cost connected with establishing an additional channel.

Figure 19:
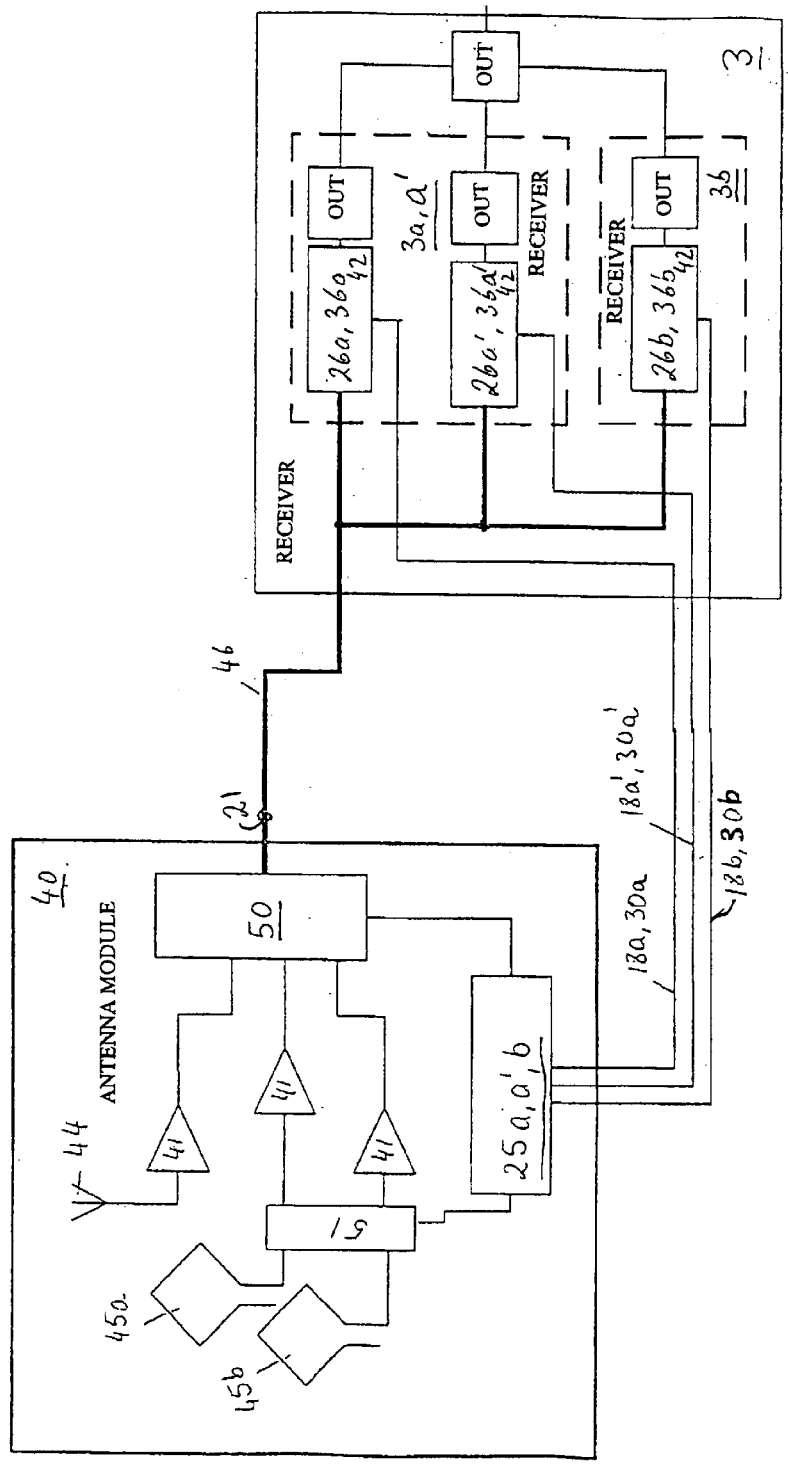
FIG. 19 is a schematic diagram of a diversity reception system for receiving satellite and terrestrial signals wherein the modified antenna module has a logic switching device, an antenna combination for circular polarization, and an elementary antenna for vertical polarization.

A further advantageous embodiment of the system according to the invention is shown in FIG. 19. Here an antenna module 40 like in FIG. 14 is used and a receiver 3 is described with only one high frequency input as in FIG. 18. Due to the larger number of alternatively available antenna signals at the antenna connection point 21, a better diversity efficiency results than with the arrangement in FIG. 18, with a particularly small cost for the high frequency line 46. This is gained with the help of the larger costs in the antenna module 40 in FIG. 19. The resulting diversity efficiency for all channels amounts to $n_t=n_{s1}=n_{s2}=2.2$. Thus $\Delta n_{ges}=3.6$ results. The noteworthy increase in the diversity efficiency compared to the arrangement in FIG. 17 is achieved by the electronic measures like the logic switching device 50, together with the reversing switch 51 in antenna module 40 coupled to reception level test device (25a, 25a', 25b). With this solution, the small cost of the high frequency line is advantageous in connection with the need for only one mounting location for the antenna in the vehicle.

Figure 20:
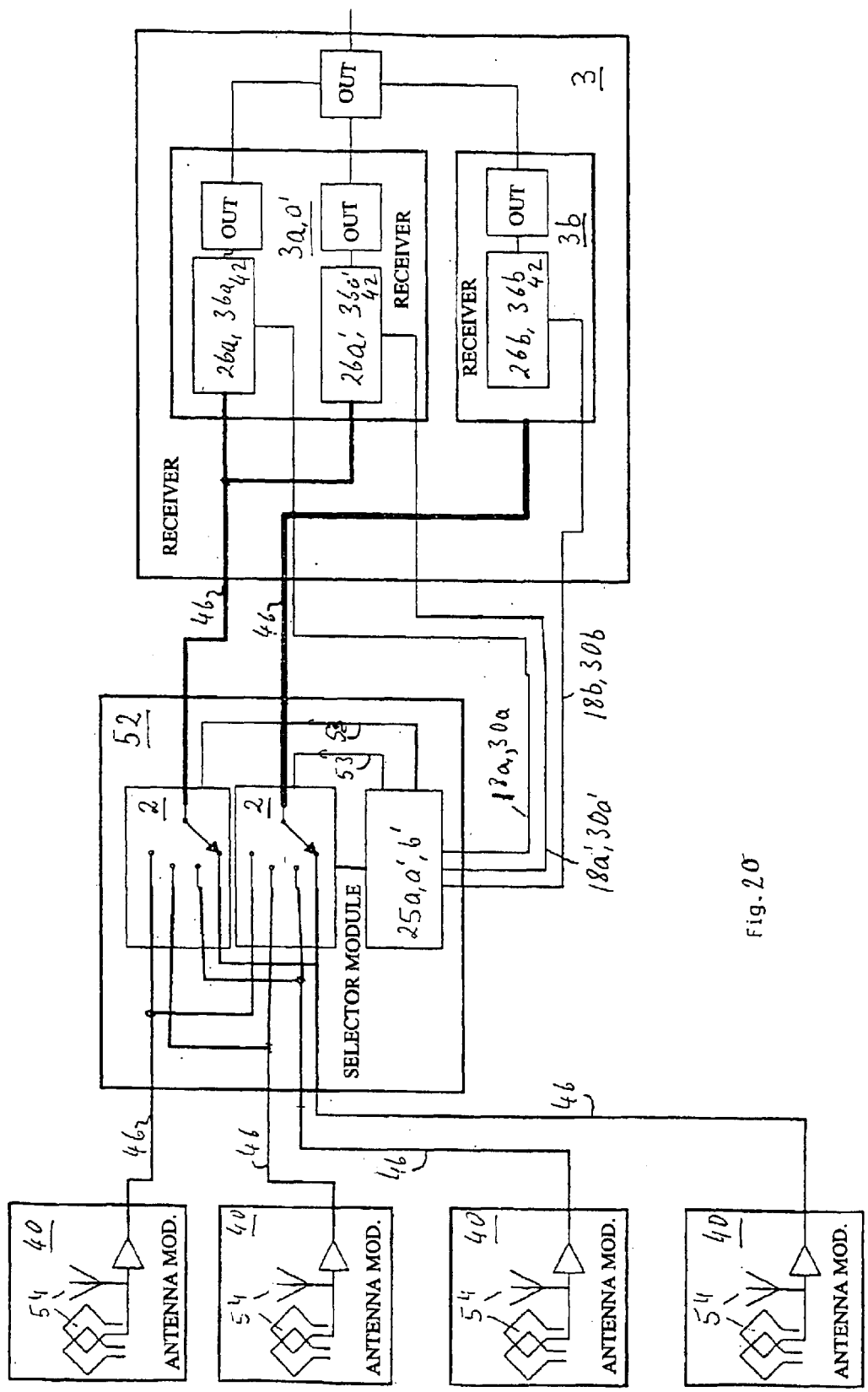
FIG. 20 is a schematic diagram of a diversity reception system for receiving satellite and terrestrial signals having four modified antenna modules wherein the selector module has two logic switching devices.

The desire for antennas that are as inconspicuous as possible originates from the automobile industry. Thus, inconspicuous and simpler antenna elements in the form of a combined antennas for terrestrial and satellite signals can be used, which are mounted in larger numbers on the various mounting locations on the vehicle. These antennas can be in the form of patch antennas. In FIG. 20, shows an antenna system having four antenna modules 40 each having a combined antenna for terrestrial and satellite signals 54. The remaining design is similar to FIG. 16 above. Due to the decorrelation of all signals delivered by the antennas, the diversity efficiency of the terrestrial channel amounts to $n_t=4$. For both satellite channels, respectively, a diversity efficiency of $n_{s1}=n_{s2}=2.8$ results. Thus the total diversity efficiency is $n_{ges}=n_t+n_{s1}+n_{s2}=9.6$ and $\Delta n_{ges}=6.6$. This arrangement provides that when there is a favorable sectoral cover in accordance with the diversity of all directions of space, the reception is also guaranteed in areas without Rayleigh-distribution. Thus, where there is a direct incidence of the satellite and terrestrial signals, antennas integrated in the vehicle are possible.

Figure 21:
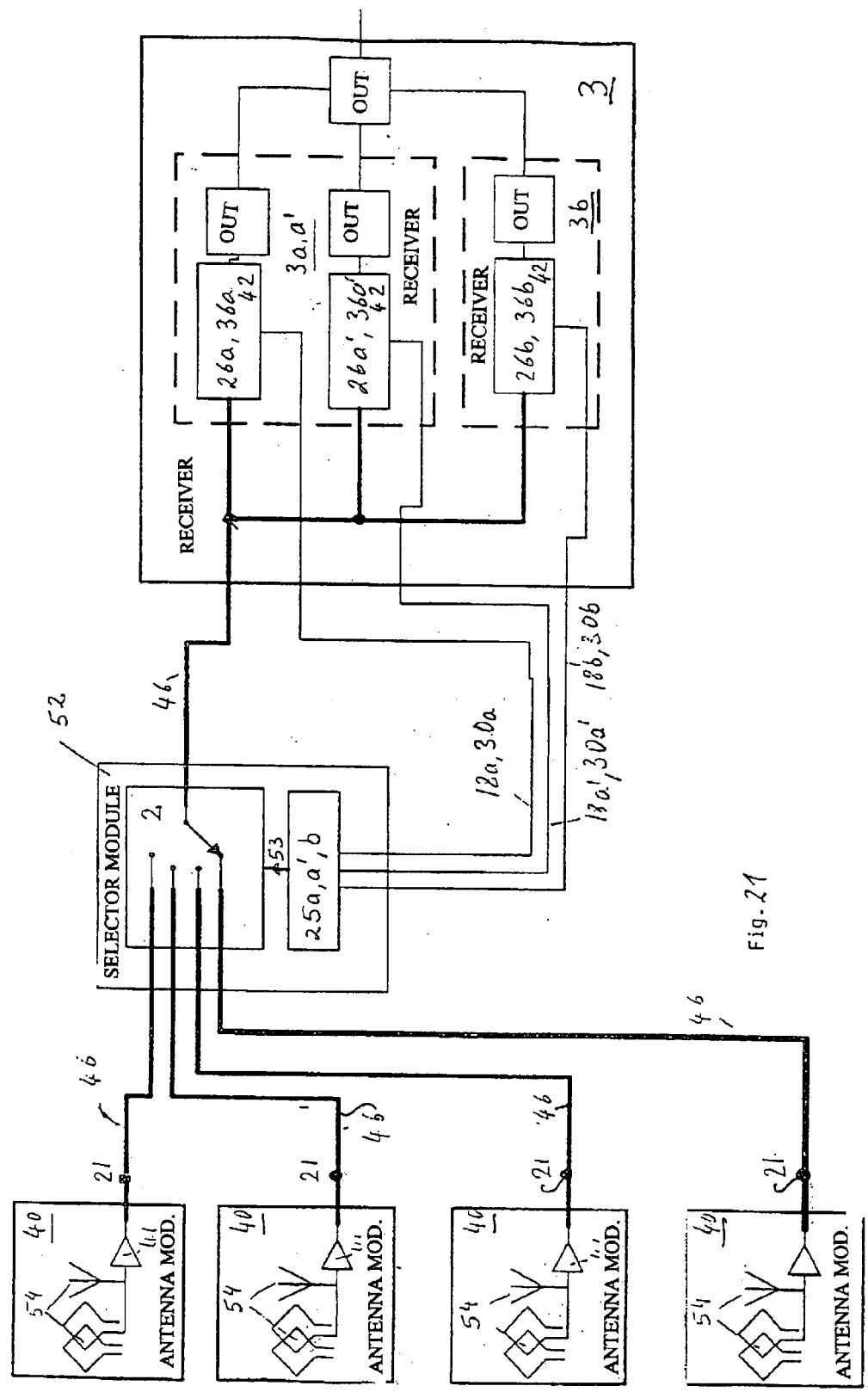
FIG. 21 is a schematic diagram of a diversity reception system as shown in FIG. 20 having only one high frequency input for all signals.

An advantageous embodiment of the antenna system in FIG. 20 is in FIG. 21, however, shown using one receiver with only one high frequency input. Thus, there is only one high frequency line 46 between selector module 52 and receiver 3. The diversity efficiency, which results for all channels amounts to $n_t=n_{s1}=n_{s2}=2.4$. Thus, $\Delta n_{ges}=4.2$ results.

Accordingly, while several embodiments of the present invention have been shown and described, it is to be understood that many changes and modifications may be made thereunto without departing from the spirit and scope of the invention as defined in the appended claims.

What is claimed is:

1. A diversity reception system for the reception of two digitally modified satellite signals and a digitally modulated terrestrial signal further comprising:
   a) an antenna module having a first signal path for a reception of satellite signals and a second separate signal path for a reception of terrestrial signals;
   b) at least two outputs for said antenna module with each output for conveying a terrestrial or a satellite signal;
   c) a receiver having a high frequency input for satellite signals and a high frequency input for terrestrial signals, said receiver having:
      i) at least one logic switching device having at least two inputs corresponding to said at least two outputs of said antenna module;
      ii) a plurality of separate reception level testing devices disposed in said receiver and coupled to said at least one logic switching device;
      iii) a plurality of HF-ZF components for each satellite channel and terrestrial channel coupled to said plurality of separate reception level testing devices; and
   d) a plurality of high frequency lines extending from said at least two outputs on said antenna module to said logic switching devices in said receiver, said plurality of high frequency lines forming separate channels for satellite signals and for terrestrial signals so that the most favorable signal in terms of diversity can be selected based upon the signal with the lowest bit error rate.

2. A diversity receiving system as in claim 1, further comprising at least one additional antenna module and wherein said receiver has four high frequency inputs fed by four high frequency lines, wherein said plurality of HF-ZF components controlling said at least one logic switching device allows a most favorable signal in said high frequency lines through said at least one logic switching device.

3. A diversity receiving system for the reception of two digitally modified satellite signals and a digitally modulated terrestrial signal comprising:
   a) an antenna module having at least two outputs comprising:
      i) a primary antenna for vertical polarization;
      ii) an antenna combination for circular polarization comprising a first elementary antenna and a second elementary antenna;
      iii) a reversing switch, in communication with said antenna combination for alternately providing different signals from said first circularly polarized antenna and said second circularly polarized antenna;
      iv) a logic switching device having its input coupled to said reversing switch and said elementary antenna for vertical polarization; and
      v) a reception level testing device disposed in said antenna module and in communication with said reversing switch and said logic switching device; and
   b) a receiver in communication with said antenna module wherein said receiver feeds reception level and symbol cycle signals to said reception level testing devices to said antenna module so that the most favorable signal in terms of diversity can be selected based upon the signal with the lowest bit error rate.

4. A diversity receiving system for the reception of two digitally modified satellite signals and a digitally modulated terrestrial signal further comprising:
   a) an antenna module having at least two outputs comprising:

i) an antenna for vertical polarization;
ii) an antenna combination for circular polarization comprising a first elementary antenna and a second elementary antenna;
iii) a logic switching device in communication with said antenna combination for circular polarization and said antenna for vertical polarization and coupled to said antenna module outputs; and
iv) a reception level testing device disposed in said antenna module and in communication with said two signal paths of said antenna for vertical polarization and said antenna combination for circular polarization; and b) a receiver in communication with said outputs of said antenna module wherein said receiver feeds reception level and symbol cycle signals to said reception level testing device of said antenna module so that the most favorable signal in terms of diversity can be selected based upon the signal with the lowest bit error rate.

5. A diversity reception system for the reception of at least two digitally modulated satellite signals and of at least one digitally modulated terrestrial signal comprising:

a) at least two antenna modules;
b) a plurality of high frequency lines coupled to said at least two antenna modules wherein said plurality of high frequency lines have at least one signal path for conveying a reception of satellite signals and at least one separate signal path for conveying a reception of terrestrial signals wherein each of said antenna modules has an output for terrestrial signals and an output for satellite signals;
c) a selector module comprising:
   i) at least one logic switching device in communication with said plurality of high frequency lines;
   ii) a plurality of reception level test devices in communication with said at least one logic switch device; and
d) a receiver in communication with said selector module via said plurality of high frequency lines, said receiver having a high frequency input for satellite signals and a high frequency input for terrestrial signals which contain a reception level and symbol cycle signals which are fed back to said plurality of reception level test devices in said selector module wherein an output of each of said at least one logic switching device is connected to said high frequency inputs of said receiver via said plurality of high frequency lines so that switching devices in response to said reception level and symbol cycle signals, will switch to the most favorable signal, which is the signal with the lowest bit error rate from said antenna modules to said receiver.

6. The diversity reception system as in claim 5, wherein said selector module has only one logic switching device.

7. A diversity reception system comprising:
a) an antenna module having:
   i) an antenna combination for circular polarization
   ii) an elementary antenna for vertical polarization wherein said antenna module has a signal path for satellite signals and a signal path for terrestrial signals;
   iii) at least one logic switching device disposed in said antenna module wherein said at least one logic switching device is in communication with said antenna combination for circular polarization and in communication with said elementary antenna for vertical polarization, wherein signals of said two signal paths are fed to said logic switching device; and
   iv) a reception level testing device disposed in said antenna module and in communication with said at least one logic switching device,
b) at least one high frequency line for conveying a plurality of signals from said antenna module; and
c) a receiver in communication with said at least one high frequency line and having one common high frequency input having signal branching for satellite signals and terrestrial signals wherein a reception level and a plurality of symbol cycle signals are coupled from said receiver and fed to said reception level test device in said antenna module so as to selectively switch said logic switching device to select the most favorable signal in terms of diversity, which is the signal with the lowest bit error rate, from said antenna module for connection to said receiver.

8. The diversity reception system as in claim 7, wherein within said antenna module said antenna combination for circular polarization has a plurality of outputs, a reversing switch coupled to said plurality of antenna outputs and having its output coupled to said logic switching device and responsive to said reception level testing device.

9. A diversity reception system as in claim 4, wherein said at least two antenna modules comprise at least four antenna modules and wherein each antenna module includes a combined antenna for terrestrial and satellite signals wherein said antenna modules are mounted to cover a maximum of directions in space to ensure antenna diversity.

10. A diversity reception system as in claim 5, wherein said at least two antenna modules comprise at least four antenna modules and wherein each antenna module includes a combined antenna for terrestrial and satellite signals wherein said antenna modules are mounted to cover a maximum of directions in space to ensure antenna diversity.

* * * * *